(12) United States Patent
Tateyama et al.

(10) Patent No.: US 8,406,111 B2
(45) Date of Patent: Mar. 26, 2013

(54) OBJECTIVE LENS AND OPTICAL PICKUP DEVICE

(75) Inventors: Kiyono Tateyama, Hino (JP); Kentarou Nakamura, Tokyo (JP)

(73) Assignee: Konica Minolta Optp, Inc., Tokyo (JP)

( * ) Notice: Subject to any disclaimer, the term of this patent is extended or adjusted under 35 U.S.C. 154(b) by 168 days.

(21) Appl. No.: 13/056,256

(22) PCT Filed: Jul. 21, 2009

(86) PCT No.: PCT/JP2009/063038
§ 371 (c)(1),
(2), (4) Date: Jan. 27, 2011

(87) PCT Pub. No.: WO2010/013616
PCT Pub. Date: Feb. 4, 2010

(65) Prior Publication Data
US 2011/0122755 A1    May 26, 2011

(30) Foreign Application Priority Data

Jul. 30, 2008   (JP) .................................. 2008-196300

(51) Int. Cl.
*G11B 7/135* (2006.01)

(52) U.S. Cl. .................... 369/112.23; 359/569; 359/571; 359/719

(58) Field of Classification Search .............. 369/112.23
See application file for complete search history.

(56) References Cited

U.S. PATENT DOCUMENTS

| | | | |
|---|---|---|---|
| 2004/0047269 A1* | 3/2004 | Ikenaka et al. | 369/112.08 |
| 2006/0256674 A1* | 11/2006 | Ikenaka et al. | 369/44.37 |
| 2009/0034398 A1* | 2/2009 | Kaneda et al. | 369/112.03 |

FOREIGN PATENT DOCUMENTS

| | | |
|---|---|---|
| JP | 2005-158208 | 6/2005 |
| JP | 2005-259332 | 9/2005 |
| WO | WO 2007/123112 | 11/2007 |
| WO | WO 2008/007552 | 1/2008 |

* cited by examiner

*Primary Examiner* — Regina N Holder
*Assistant Examiner* — Brenda Bernardi
(74) *Attorney, Agent, or Firm* — Cozen O'Connor

(57) ABSTRACT

Provided are an objective lens with enhanced transmittance and an optical pickup apparatus which can record and/or reproduce information properly for three kinds of discs with different recording densities, even if a single lens is used as the objective lens. When all the expressions (1) to (3) are satisfied, excellent aberration characteristics can be obtained for the three kinds of discs: $-0.02 \leq m1 \leq 0.02$ (1); $0 \leq (WD1-WD2) \leq 1.57\ m2+0.123$ or $1.57\ m2+0.24 \leq (WD1-WD2) \leq 0.7$ (2); and $0 \leq (WD1-WD3) \leq 1.79\ m3+0.333$ or $1.66\ m3+0.508 \leq (WD1-WD3) \leq 0.7$ (3).

13 Claims, 6 Drawing Sheets

OBJECTIVE LENS AND OPTICAL PICKUP DEVICE

RELATED APPLICATIONS

This application is a U.S. National Phase Application under 35 USC 371 of International Application PCT/JP2009/063038 filed Jul. 21, 2009.

This application claims the priority of Japanese application 2008-196300 filed Jul. 30, 2008, the entire content of which is hereby incorporated by reference.

TECHNICAL FIELD

The present invention relates to an optical pickup apparatus which can record and/or reproduce information compatibly for various types of optical discs, and to an objective lens for use in the same.

BACKGROUND ART

In recent years, in an optical pickup apparatus, a wavelength of a laser light source which is employed as a light source for reproducing information recorded on an optical disc and for recording information on an optical disc, is becoming shorter. For example, a laser light source having 400-420 nm wavelength, such as a blue-violet semiconductor laser and a blue-SHG laser which converts wavelength of an infrared semiconductor laser utilizing a second harmonic wave, has been made practical. When these blue-violet optical sources are used, information of about 25 GB can be recorded on the optical disc having a diameter of 12 cm under the condition that an objective lens having the same numerical aperture (NA) as a DVD (Digital Versatile Disc) is used. In the description, an optical disc and an optical-magnetic disc which employ a blue-violet laser light source are referred as "high density optical discs" as their general name.

Hereupon, as for a high density optical disc using an objective lens with NA of 0.85, coma caused due to an inclination (skew) of the optical disc becomes larger. Therefore, some of the high density optical discs are designed so that its protective layer becomes thinner (which is 0.1 mm, while that of a DVD is 0.6 mm) than that of a DVD, to reduce the amount of coma due to the skew. On the other hand, it is hard to say that a value of an optical disc player/recorder (optical information recording and reproducing apparatus) as a product is not enough under just a condition that it can record and/or reproduce information for the above high density optical discs properly. Taking account of a fact that, at present, DVDs and CDs (Compact Discs) onto which various kinds of information have been recorded, are on the market, it is not enough that information can be recorded/reproduced only for the above high density optical disc properly. For example, realization of recording and/or reproducing information appropriately also for DVDs and CDs which are owned by users, leads to enhancement of its commercial value as an optical disc player/recorder for high density optical discs. From these backgrounds, an optical pickup apparatus installed in an optical disc player/recorder for high density optical discs is required to have a property to be capable of appropriately recording and/or reproducing information not only for the high density optical discs but also for DVDs and CDs, with maintaining compatibility.

As a method which is capable of recording and/or reproducing information adequately to anyone of high density optical discs and DVDs and further to CDs with maintaining compatibility, there can be considered a method to selectively switch an optical system for high density optical discs and an optical system for DVDs and CDs, corresponding to the recording density of an optical disc on which information will be recorded and/or reproduced. However, it is disadvantageous for the size-reduction and increases the cost, because it requires a plurality of optical systems.

Accordingly, in order to simplify the structure of an optical pickup apparatus and to intend the reduction of cost, it is preferable to make an optical system for high density optical discs and an optical system for DVDs and CDs into a common optical system, and to reduce the number of optical parts constructing the optical pickup apparatus as much as possible, even in the optical pickup apparatus with compatibility. Then, providing the common objective lens which is arranged with facing an optical disc, is most advantageous for the simplification of the construction and cost reduction of the optical pickup apparatus. Here, in order to obtain an objective lens which can be commonly used for plural kinds of optical discs for which different recording/reproducing wavelengths are used, it is required that an optical path difference providing structure having a wavelength dependency in spherical aberration, is formed on the objective optical system, to reduce spherical aberrations caused by a difference in wavelength and a difference in thickness of protective layers.

Patent Literature 1 discloses an optical element for use in an objective lens that includes an optical path difference providing structures and that is usable compatibly for high density optical discs and conventional DVDs and CDs.

CITATION LIST

Patent Literature

Patent Literature 1: JP-A No. 2005-259332

SUMMARY OF INVENTION

Technical Problem

Meanwhile, when a high density optical disc, a DVD and CD are made to be different from each other in terms of numerical apertures NAs, it is preferable to form, for example, a light flux that passes through the outside of the numerical aperture for a DVD into flare light on an information recording surface, because it is not necessary to use an aperture limitation separately. Therefore, in the objective lens in Patent Document 1, a diffractive structure is provided on the area outside the numerical aperture for a DVD, so that the zero-th-order diffracted light may be generated for the light flux for the high density optical disc, and the prescribed order diffracted light may be generated for a light flux for a DVD and CD.

However, the diffractive structure is a microscopic structure that is formed by shifting a base aspheric surface in the direction of an optical axis. Therefore, there are problems that vignetting of a ray is easily caused by manufacturing errors, and transmittance is lowered. From that background, there is an attempt to form an area of an objective lens, including only a refractive surface and being used only for recording and/or reproducing information for a high density optical disc, for the purpose of further enhancing transmittance of a light flux for high density optical disc that particularly requires an amount of light. However, when the area of an objective lens used for only recording and/or reproducing of information of a high density optical disc is formed only by a refractive surface, an effective flare is not generated, because a degree of freedom for flare control is lowered for light fluxes for a DVD and CD. Thereby, a numerical aperture becomes inappropriate when a DVD or CD is used, and there is a fear that information cannot be recorded and/or reproduced appropriately.

The present invention has been achieved by taking the aforesaid problems into consideration, and its object is to provide an optical pickup apparatus and an objective lens which can record and/or reproduce information properly for three kinds of discs with different recording densities, such as a high density disc (BD in particular), DVD and CD, even if a single lens is used as the objective lens, where the objective lens can be improved in terms of transmittance and the optical pickup apparatus is equipped with the objective lens.

Solution to Problem

For solving the aforesaid problems, the objective lens described in Item 1 is an objective lens for use in an optical pickup apparatus comprising an objective lens, for forming a converged spot on an information recording surface of a first optical disc including a protective layer with a thickness t1 by using a first light flux with a wavelength λ1 (μm) emitted from a first light source, for forming a converged spot on an information recording surface of a second optical disc including a protective layer with a thickness t2 (t1≦t2) by using a second light flux with a wavelength λ2 (λ1<λ2) emitted from a second light source, and for forming a converged spot on an information recording surface of a third optical disc including a protective layer with a thickness t3 (t2<t3) by using a third light flux with a wavelength λ3 (λ2<λ3) emitted from a third light source. The objective lens is characterized in that the objective lens is formed of a single lens, and an optical surface of the single lens comprises a central area whose center is located at an optical axis, a peripheral area in a ringed shape formed around the central area, and a most peripheral area in a ringed shape formed around the peripheral area. The objective lens is further characterized in that the first light flux which has passed through the central area, the peripheral area and the most peripheral area is converged on the information recording surface of the first optical disc, the second light flux which has passed through the central area and the peripheral area is converged on the information recording surface of the second optical disc, the second light flux which has passed through the most peripheral area is not converged on the information recording surface of the second optical disc, the third light flux which has passed through the central area is converged on the information recording surface of the third optical disc, and the third light flux which has passed through the peripheral area and the most peripheral area is not converged on the information recording surface of the third optical disc. The objective lens is further characterized in that the most peripheral area is a refractive surface, and the objective lens satisfies all of the conditional expressions (1) to (3), where m1 is an image-forming magnification of the objective lens when information is reproduced and/or recoded for the first optical information recording medium, m2 is an image-forming magnification of the objective lens when information is reproduced and/or recoded for the second optical information recording medium, m3 is an image-forming magnification of the objective lens when information is reproduced and/or recoded for the third optical information recording medium, WD1 (mm) is a working distance of the objective lens when information is reproduced and/or recoded for the first optical information recording medium, WD2 (mm) is a working distance of the objective lens when information is reproduced and/or recoded for the second optical information recording medium, and WD3 (mm) is a working distance of the objective lens when information is reproduced and/or recoded for the third optical information recording medium.

$$-0.02 \leq m1 \leq 0.02 \quad (1)$$

$$0 \leq (WD1-WD2) \leq 1.57m2+0.123 \text{ or}$$

$$1.57m2+0.24 \leq (WD1-WD2) \leq 0.7 \quad (2)$$

$$0 \leq (WD1-WD3) \leq 1.79m3+0.333 \text{ or}$$

$$1.66m3+0.508 \leq (WD1-WD3) \leq 0.7 \quad (3)$$

A principle of the present invention will be explained as follows. FIG. 6 is a schematic diagram with numerical aperture as the vertical axis and spherical aberration as the horizontal axis. Now, the explanation will be given by using a DVD as the second optical disc. Since the numerical aperture NA2 of DVD is about 0.6, it is preferable that a light flux that passes through an area which is outside the numerical aperture of 0.6 (which is a most peripheral area in this particular case) does not contribute to a converged spot as a flare, in the objective lens. However, when the most peripheral area of the objective lens is made to be a refractive surface, aberration characteristics (waveforms) of an area that exceeds the numerical aperture NA2 in terms of an area range is determined reluctantly, as shown in FIG. 6. Therefore, a converged spot is narrowed excessively, depending on a position (WD2) where beams that have passed through an area that is equal to or lower than numerical aperture NA2 are converged, resulting in a fear that recording and/or reproducing of information of DVD cannot be conducted. To be concrete, if a position (WD2) where beams that have passed through an area lower than numerical aperture NA2 are converged is close to a position where beams that have passed through an area having a numerical aperture higher than numerical aperture NA2 are converged (the state shown in (1) of FIG. 6), recording and/or reproducing of information of DVD becomes to be impossible, while, if a position (WD2) where beams that have passed through an area that is equal to or lower than numerical aperture NA2 are converged is away from a position where beams that have passed through an area having a numerical aperture that is equal to or higher than numerical aperture NA2 are converged (the state shown in (2) of FIG. 6), a numerical aperture of a spot of DVD becomes to be NA2, and recording and/or reproducing of information becomes to be possible. The same also applies to the third disc (for example, CD).

Therefore, in the invention, there is determined a working distance that makes it possible to obtain a desired numerical aperture when a DVD and CD are used, as shown in (2) and (3) of FIG. 6. FIG. 7 is a diagram schematically showing the condition of light converging when a DVD is used as the second disc, and FIG. 8 is a diagram schematically showing the condition of light converging when a BD is used as the first disc.

In FIG. 7, the second light flux that has passed through an area exceeding numerical aperture NA2 of a DVD becomes to be a flare (an area shown with hatching in FIG. 7), without being converged on an information recording surface of a DVD. In that case, the following expression holds, where fD represents a back focal length of the objective lens for a beam of a wavelength for a DVD under the assumption that there is no optical disc, WD2 represents a working distance in the case of using a DVD, thickness t2 of a protective layer for a DVD is made to be 0.6 mm, nD represents its refractive index, and WD' represents a displacement amount of a position where the second light flux that has passed through an area that exceeds numerical aperture NA2 for a DVD is converged.

$$fD = WD2 + WD' + (0.6/nD) \quad (20)$$

On the other hand, the following expression holds, where fB represents a back focal length of the objective lens for a beam of a wavelength for a BD under the assumption that there is no optical disc, WD1 represents a working distance for a BD, thickness t1 of a protective layer for a BD is made to be 0.1 mm and nB represents its refractive index.

$$fB = WD1 + (0.1/nB) \quad (21)$$

From the expressions (20) and (21), it is possible to obtain $$fD - fB = WD2 + WD' + (0.6/nD) - (WD1 + (0.1/nB))$$

and further to obtain, $$WD' = fD - fB - WD2 - (0.6/nD) + WD1 + (0.1/nB)$$
$$= (fD - fB + (0.1/nB) - (0.6/nD)) + WD1 - WD2$$

In this case, since (fD−fB+(0.1/nB)−(0.6/nD)) is a value depending mainly on the magnification. Therefore, when the magnification has been determined, WD' turns out to be a value that is changed under a parameter of WD1−WD2. Further, WD' corresponds to the shift amount of the aberration shown in FIG. 6. Therefore, if WD1−WD2 is established to be an appropriate value, a value of WD' is also determined, thus, it is possible to improve a flare for a DVD and to conduct recording and/or reproducing of information properly for a DVD, even when the most peripheral area of the objective lens is made to be a refractive surface. Similarly, when a displacement amount of a position where the third light flux that has passed through an area that exceeds numerical aperture NA2 is converged is represented by WD", the WD" turns out to be a value that is changed under a parameter of WD1−WD3. Therefore, if WD1−WD3 is established to be an appropriate value, a value of WD" is also determined. Thus, it is possible to improve a flare for a CD and to conduct recording and/or reproducing of information properly for a CD, even when the most peripheral area of the objective lens is made to be a refractive surface.

After studying energetically based on the aforesaid thought, the inventors of the invention found out that excellent aberration characteristics can be obtained for all of the second optical disc and the third optical disc, when all of the following conditional expressions (1)-(3) are satisfied.

$$-0.02 \leq m1 \leq 0.02 \quad (1)$$

$$0 \leq (WD1 - WD2) \leq 1.57m2 + 0.123 \text{ or } 1.57m2 + 0.24 \leq (WD1 - WD2) \leq 0.7 \quad (2)$$

$$0 \leq (WD1 - WD3) \leq 1.79m3 + 0.333 \text{ or } 1.66m3 + 0.508 \leq (WD1 - WD3) \leq 0.7 \quad (3)$$

The objective lens described in Item 2 is an objective lens according to the invention described in Item 1, characterized by satisfying the following conditional expressions (4) and (5).

The objective lens described in Item 3 is an objective lens according to the invention described in Item 1 or 2, characterized by satisfying the following conditional expression.

The objective lens described in Item 4 is an objective lens according to the invention described in any one of Items 1 to 3, characterized in that the peripheral area comprises a second diffractive structure, a 0-th-order diffracted light flux has a maximum diffraction-light amount among diffracted light fluxes generated when the first light flux enters the second diffractive structure, and a first-order diffracted light flux has a maximum diffraction-light amount among diffracted light fluxes generated when the second light flux enters the second diffractive structure. When the first light flux enters the peripheral area and the most peripheral area, they use a refracted light flux generated on those areas. Therefore, when a change in wavelength of a light flux and a change in temperature are carried out, the direction of generation (under or over) and an amount of aberrations are same in the two areas, and a change in aberration does not become discontinuous, which is preferable.

The objective lens described in Item 5 is an objective lens according to the invention described in any one of Items 1 to 4, characterized in that the central area comprises a first diffractive structure, the first diffractive structure has a blaze structure, a second-order diffracted light flux has a maximum diffraction-light amount among diffracted light fluxes generated when the first light flux enters the first diffractive structure, a first-order diffracted light flux has a maximum diffraction-light amount among diffracted light fluxes generated when the second light flux enters the first diffractive structure, and a first order diffracted light flux has a maximum diffraction-light amount among diffracted light fluxes generated when the third light flux enters the first diffractive structure. When such the diffraction orders are employed, diffracted light fluxes with every wavelengths can secure high diffraction efficiencies, which allows to obtain converted spots with enough intensities to record and/or reproducing info illation.

The objective lens described in Item 6 is an objective lens according to the invention described in any one of Items 1 to 4, characterized in that the central area comprises a first diffractive structure, the first diffractive structure is a structure in which a first blaze structure and a second blaze structure are overlapped together, a second-order diffracted light flux has a maximum diffraction-light amount among diffracted light fluxes generated when the first light flux enters the first blaze structure, a first-order diffracted light flux has a maximum diffraction-light amount among diffracted light fluxes generated when the second light flux enters the first blaze structure, a first-order diffracted light flux has a maximum diffraction-light amount among diffracted light fluxes generated when the third light flux enters the first blaze structure, a first-order diffracted light flux has a maximum diffraction-light amount among diffracted light fluxes generated when the first light flux enters the second blaze structure, a first-order diffracted light flux has a maximum diffraction-light amount among diffracted light fluxes generated when the second light flux enters the second blaze structure, and a first-order diffracted light flux has a maximum diffraction-light amount among diffracted light fluxes generated when the third light flux enters the second blaze structure.

The objective lens described in Item 7 is an objective lens according to the invention described in any one of Items 1 to 4, characterized in that the central area comprises a first diffractive structure, and the first diffractive structure includes a step structure.

The objective lens described in Item 8 is an objective lens according to the invention described in any one of Items 1 to 7, characterized in that the first diffractive structure is formed by overlapping a blaze structure and a step structure together.

The objective lens described in Item 9 is an objective lens according to the invention described in any one of Items 5 to 8, characterized by satisfying any one of the following conditional expressions (6) and (7), where dor1 is a diffraction order number of a diffracted light with a maximum light amount among diffracted light fluxes generated when the first light flux enters the first diffractive structure, dor2 is a diffraction order number of a diffracted light with a maximum light amount among diffracted light fluxes generated when the second light flux enters the first diffractive structure, dor3 is a diffraction order number of a diffracted light with a maximum light amount among diffracted light fluxes generated when the third light flux enters the first diffractive structure, $C\lambda 1$ is a second-order term with respect to the first light flux in an optical path difference function for defining the first diffractive structure, $C\lambda 2$ is a second-order term with respect to the second light flux in an optical path difference function for defining the first diffractive structure, and $C\lambda 3$ is a second-order term with respect to the third light flux in an optical path difference function for defining the first diffractive structure.

$$(dor1 \times C\lambda 1)/(dor2 \times C\lambda 2) < 0 \qquad (6)$$

$$(dor1 \times C\lambda 1)/(dor3 \times C\lambda 3) < 0 \qquad (7)$$

In this description, satisfying the expression (6) means that the sign (plus or minus) of the diffraction order number dor1 is opposite to the sign of the diffraction number order dor2. Further, satisfying the expression (7) means that the sign of the diffraction order number dor1 is opposite to the sign of the diffraction number order dor3. Under the condition that the expression (6) or (7) are satisfied, when the most peripheral area is provided as a refractive surface, the third-order spherical aberration SA3 and the fifth-order spherical aberration SA5 both caused corresponding to a fluctuation of wavelength of a light source are the same in terms of polarity (sign), and the ratio of absolute values |SA5|/|SA3| of them can be made close to $\frac{1}{8}$. Therefore, spherical aberrations remaining because of adjusting errors of positions of semiconductor lasers provided as light sources, caused when an optical pickup apparatus is assembled, can be controlled, which enlarges error tolerance for semiconductor lasers and can aim to reduce the cost.

An optical pickup apparatus described in Item 10 is characterized by comprising the objective lens described in any one of Items 1 to 9.

An optical pickup apparatus relating to the present invention comprises at least three light sources including a first light source, a second light source and a third light source. The optical pickup apparatus relating to the present invention comprises a light-converging optical system for converging the first light flux on an information recording surface of the first optical disc, for converging the second light flux on an information recording surface of the second optical disc and for converging the third light flux on an information recording surface of the third optical disc. The optical pickup apparatus relating to the present invention comprises a light-receiving element for receiving light reflected on an information recording surface of the first optical disc, the second optical disc or the third optical disc. Herein, it is preferable that the first optical disc is a BD (Blu-ray Disc), the second optical disc is a DVD, and the third optical disc is a CD. However, the discs are not limited to those. Each of the first optical disc, the second optical disc, and the third optical disc may be a multilayered optical disc including plural information recording layers.

As for a BD, information is recorded and/or reproduced with an objective lens with NA of 0.85, and it has a protective layer with a thickness about 0.1 mm. Further, a DVD represents a generic name of optical discs wherein information is recorded and/or reproduced with an objective lens with NA in the range of about 0.60 to 0.67 and its protective layer has a thickness about 0.6 mm, and involves DVD-ROM, DVD-Video, DVD-Audio, DVD-RAM, DVD-R, DVD-RW, DVD+R and DVD+RW. In the present specification, a CD represents a generic name of optical discs wherein information is recorded and/or reproduced by an objective lens with NA in the range of about 0.45 to 0.53 and its protective layer has the thickness about 1.2 mm, and involves CD-ROM, CD-Audio, CD-Video, CD-R and CD-RW. As for a recording density, a BD has the highest recording density, and recording densities of a DVD and CD decrease in this order.

Thicknesses t1, t2, and t3 of the protective substrates preferably satisfy the following conditional expressions (8), (9), and (10). However, the thicknesses are not limited to them.

$$0.0750 \text{ mm} \leq t1 \leq 0.1125 \text{ mm} \qquad (8)$$

$$0.5 \text{ mm} \leq t2 \leq 0.7 \text{ mm} \qquad (9)$$

$$1.0 \text{ mm} \leq t3 \leq 1.3 \text{ mm} \qquad (10)$$

In the present specification, each of the first light source, the second light source and the third light source is preferably a laser light source. Lasers such that a semiconductor laser, and a silicon laser are preferably used for the laser light source. The first wavelength $\lambda 1$ of the first light flux emitted from the first light source, the second wavelength $\lambda 2$ ($\lambda 2 > \lambda 1$) of the second light flux emitted from the second light source, and the third wavelength $\lambda 3$ ($\lambda 3 > \lambda 2$) of the third light flux emitted from the third light source, are preferable to satisfy the following conditional expressions (11) and (12).

$$1.5 \times \lambda 1 < \lambda 2 < 1.7 \times \lambda 1 \qquad (11)$$

$$1.9 \times \lambda 1 < \lambda 3 < 2.1 \times \lambda 1 \qquad (12)$$

When a BD, DVD, and CD are employed as the first optical disc, the second optical disc, and the third optical disc, respectively, the wavelength $\lambda 1$ of the first light source is preferably 0.35 μm or more, and 0.44 μm or less, and is more preferably 0.38 μm or more, and 0.415 μm or less; the second wavelength $\lambda 2$ of the second light source is preferably 0.57 μm or more, and 0.68 μm or less, and is more preferably 0.63 μm or more, and 0.67 μm or less; and the third wavelength $\lambda 3$ of the third light source is preferably 0.75 μm or more, and 0.85 μm or less, and is more preferably 0.76 μm or more, and 0.82 μm or less.

Further, at least two light sources of the first light source, the second light source, and the third light source may be unitized. The unitization means fixing and housing, for example, the first light source and the second light source into one package. However, it is not limited to the above, the unitization in a broad sense involves a situation that two light sources are fixed so that aberration can not be corrected. Further, in addition to the light source, the light-receiving element which will be described later, may also be provided as one package.

As the light-receiving element, a photodetector such as a photodiode is preferably used. Light reflected on an information recording surface of an optical disc enters into the light-receiving element, and signal outputted from the light-receiving element is used for obtaining the read signal of information recorded in each optical disc. Further, a change in the light amount caused with a change in shape and a change in position of a spot on the light-receiving element, are detected to conduct a focus detection and a tracking detection. Based on these detections, the objective lens can be moved for focusing and tracking operations. The light-receiving element may be composed of a plurality of photo detectors. The light-receiving element may also have a main photo detector and secondary photo detector. For example, the light-receiving element is provided with a main photo detector which receives the main light used for recording and/or reproducing information, and two secondary photo detectors positioned on both sides of the main photo detector, so as to receive secondary light for tracking adjustment by the two secondary photo detectors. Further, the light-receiving element may also comprise a plurality of light-receiving elements corresponding to respective light sources.

The light-converging optical system comprises an objective lens. The light-converging optical system may comprise only an objective lens. However, the light-converging optical system may further comprise a coupling lens such as a collimation lens other than the objective lens. The coupling lens is arranged between the objective lens and the light source and means a single lens or a lens group which changes divergent angle of a light flux. The collimation lens is a kind of coupling lens and is a lens to convert a light flux which has entered the collimation lens into a parallel light flux and to emit the resulting light. Further, the light-converging optical system may also comprise an optical element such as a diffractive optical element which divides a light flux emitted from a light source into a main light flux used for recording and reproducing information and two secondary light fluxes used for operations such as a tracking operation. In the present specification, an objective lens means an optical system which is arranged to face an optical disc in an optical pickup apparatus and has a function to converge a light flux emitted from a light source onto an information recording surface of the optical disc. The objective lens is an objective lens formed of a single lens. The objective lens may be a glass lens, a plastic lens or a hybrid lens in which an optical path difference providing structure is formed on the glass lens by using thermosetting resin. The objective lens preferably comprises a refractive surface which is an aspheric surface. Further, in the objective lens, it is preferable that a base surface on which an optical path difference providing structure is provided is an aspheric surface.

Further, when the objective optical element is a glass lens, it is preferable that a glass material with a transition point Tg of 400° C. or less is used. By using the glass material whose glass transition point Tg is 400° C. or less, the material can be molded at a comparatively low temperature. Therefore, the life of the mold can be prolonged. As an example of the glass material whose glass transition point Tg is low, there are K-PG325 and K-PG375 (both are trade names) made by SUMITA Optical glass, Inc.

Hereupon, a glass lens generally has larger specific gravity than a resin lens. Therefore, the objective lens made of glass has larger weight and applies a larger burden to an actuator which drives the objective lens. Therefore, when a glass lens is employed for the objective lens, a glass material having small specific gravity is preferably used for the objective lens. Specifically, the specific gravity is preferably 3.0 or less, and is more preferably 2.8 or less.

Further, when a plastic lens is employed for the objective lens, it is preferable that a resin material of cyclic olefins is used for the objective lens. In the cyclic olefins, there is more preferably used the resin material having: a refractive index at the temperature 25° C. for wavelength 405 nm, which is within the range of 1.52 to 1.60; and a ratio of refractive index change dN/dT (° C.$^{-1}$) caused by a temperature change within the temperature range of −5° C. to 70° C. for the wavelength 405 nm, which is within the range of −20×10$^{-5}$ to −5×10$^{-5}$ (more preferably, −10×10$^{-5}$ to −8×10$^{-5}$). Further, when a plastic lens is employed for the objective lens, it is preferable that a plastic lens is also employed for the coupling lens.

The objective lens will be described below. At least one optical surface of the objective lens comprises a central area, a peripheral area arranged around the central area, and a most peripheral area arranged around the peripheral area. The central area preferably is an area including the optical axis of the objective lens, however, it may be an area not including the optical axis. It is preferable that the central area, peripheral area, and most peripheral area are provided on the same optical surface. As shown in FIGS. 1a and 1b, it is preferable that the central area CN, peripheral area MD, and most peripheral area OT are provided on the same optical surface concentrically around the optical axis as the center. There is preferably arranged a first diffractive structure on the central area of the objective lens. Further, there is preferably arranged a second diffractive structure on the peripheral area of the objective lens. The most peripheral area is a refractive surface. It is preferable that each of the central area, peripheral area, and most peripheral area adjoins to the neighboring area. However, there may be slight gaps between them.

The area where the first diffractive structure is provided is preferably 70% or more of the area of the central area on the objective lens. It is more preferably 90% or more of the area of the central area. The first diffractive structure is furthermore preferably provided on the entire surface of the central area. The area where the second dish active structure is provided is preferably 70% or more of the peripheral area on the objective lens. It is more preferably 90% or more of the area of the peripheral area. The second diffractive structure is further more preferably provided on the entire surface of the peripheral area.

A diffractive structure used in the present specification, is a structure which makes light flux convergent or divergent by diffractive action (it involves a structure providing aberrations by diffractive action). The diffractive structure is preferably a structure which provides an optical path difference to an incident light flux. The diffractive structure also involves a phase difference providing structure by which a phase difference is provided. The diffractive structure comprises a step difference, and preferably comprises a plurality of step differences. This step difference provides an optical path difference and/or phase difference to an incident light flux. An optical path difference provided by the diffractive structure may be an integer multiple of wavelength of an incident light flux, or may be an non-integer multiple of wavelength of an incident light flux. The step differences may be arranged with periodic interval in the perpendicular direction to the optical axis, or may be arranged with non-periodic interval in the perpendicular direction to the optical axis.

It is preferable that the diffractive structure includes a plurality of ring-shaped zones arranged concentrically around the optical axis as a center. Further, the diffractive structure can have various sectional shapes (sectional shapes in a plane including the optical axis).

It is preferable that the first diffractive structure is any one of the followings: 1) a structure whose shape in a cross section including the optical axis is a blaze structure, 2) a structure whose shape in a cross section including the optical axis is a step structure, 3) a structure formed by overlapping a first basic structure being a blaze structure and a second basic structure being a step structure together, 4) a structure formed by overlapping two types of blaze structures, namely, a first blaze structure and a second blaze structure.

The blaze structure in the above 1) means that the shape in a cross section including the optical axis of an optical element having the diffractive structure is a serrated shape as shown as FIGS. 2a and 2b. In other words, the diffractive structure includes surfaces which incline against the base surface, rather than surfaces being perpendicular to the base surface and surfaces being in parallel with the base surface. The step structure in the above 2) means that the shape in a cross section including the optical axis of an optical element having the diffractive structure includes plural small-step units (which preferably includes plural small-step units with the same number of divided portions (in other words, the same number of steps)) as shown as FIGS. 2c and 2d. When a basic structure has a step shape and its base surface is a surface with curvature, it causes a phenomenon that rays are refracted on the base surface and a refraction angle of a ray at each distance from the optical axis are different from those at other distances. Therefore, it is preferable, rather than to obtain the step structure by displacing portions the base surface in the direction parallel with of the optical axis, to obtain the step structure by displacing the base surface in the direction that the rays travel by the same optical path length.

As for a preferable example of a blaze structure described in 1), when the structure is represented by X/Y/Z (the representation that a X-th-order diffracted light flux has a maximum diffraction-light amount among diffracted light fluxes generated when the first light flux enters the structure, a Y-th-order diffracted light flux has a maximum diffraction-light amount among diffracted light fluxes generated when the second light flux enters the structure, and a Z-th-order diffracted light flux has a maximum diffraction-light amount among diffracted light fluxes generated when the third light flux enters the structure), there is cited 1/1/1 as a preferable example. A preferable value of the step-difference amount d along the optical axis of the blaze structure in this case is represented by $0.9 \cdot 1 \cdot \lambda 1/(n\lambda 1-1) \leq d \leq 1.9 \cdot 1 \cdot \lambda 1/(n\lambda 1-1)$, where $\lambda 1$ is a refractive index for wavelength $\lambda 1$.

As preferable examples of a step structure described in 2), there are cited 1/−1/−2 and 1/−2/−3. Preferable examples of the step structures in these cases, there are cited small-step structures divided into five pieces (four step differences) and seven pieces (six step differences), respectively. Preferable values of the step-difference amounts d along the optical axis of the small-step structures in these cases are represented by $0.9 \cdot 1.2 \cdot \lambda 1/(n\lambda 1-1) \leq d \leq 1.9 \cdot 1.2 \cdot \lambda 1/(n\lambda 1-1)$.

When a diffractive structure is formed by overlapping a first basic structure being a blaze structure and a second basic structure being a step structure together as described in the above 3), it is preferable that the first basic structure and the second basic structure which different from the first basic structure are overlapped together so that positions of all the step-difference portions of the first basic structure may agree with positions of the step-difference portions of the second basic structure. Preferably, there is provided an embodiment in which the structures are overlapped so that positions P1 that are deepest in the blaze structure shown in FIG. 3a and positions P2 that are deepest in the step structure shown in FIG. 3b may agree with each other in terms of a position. Thereby, the first diffractive structure shown in FIG. 3c can be obtained. As described above, a structure as shown in FIG. 3c obtained by overlapping a blaze structure and a step structure such that the positions of step differences of the blaze structure agree with the positions of large step differences of the step structure, is referred as a blaze-type step structure in the present description. In the blaze-type step structure, a diffractive structure includes surfaces inclined against its base surface and surfaces parallel with the optical axis, and includes plural small structures in which a length along the optical axis gradually varies along the direction of the base surface. Herein, plural units of ring-shaped zones of the second basic structure may be overlapped with a single unit of ring-shaped zones of the first basic structure. Further, positions of all the step-difference portions of the second basic structure may not agree with positions of step-difference portions of the first basic structure. In other words, among step-difference portions of the second basic structure, there can be one that does not agree with the step-difference portion of the first basic structure in terms of position. The diffractive structure may be foamed with or without overlapping the basic structures. In this case, the diffractive structure can have a structure in an arbitral shape as shown in FIGS. 2a to 2d and 3a to 3c.

Next, there will be cited a preferable example of a structure described in the above 4) wherein two types of blaze structures, namely, a first blaze structure and a second blaze structure are overlapped together.

When the first blaze structure is represented by X/Y/Z, X is an odd integer. When X is an odd number being 5 or less, a step-difference amount of the first basic structure does not become excessively large, which is preferable because manufacturing process becomes easy, a loss of light amount caused by manufacturing error can be controlled, and fluctuation of diffraction efficiency caused when wavelength changes.

Further, in a portion of the first basic structure arranged at least around the optical axis in the central area, its step differences face the direction opposite to the optical axis. A portion of the first basic structure arranged "at least around the optical axis in the central area" means at least a step difference at the closest position to the optical axis among step differences in which the above X becomes an odd number. Preferably, at least step differences having the above X being an odd number and existing in an area between the optical axis and a half position, measured in a direction perpendicular to the optical axis, of the area from the optical axis to the boundary of the central area and the peripheral area, face the direction opposite to the optical axis. Preferably, all the step differences of the first basic structure arranged in the central area face the direction opposite to the optical axis.

Accordingly, when the orientation of step differences of the first blaze structure in which the diffraction order number for the first light flux becomes an odd-diffraction-order number, is defined to face the opposite direction to the optical axis, a working distance can be sufficiently secured when a CD is used, even in a thick objective lens having a thick on-axis thickness so as to be used for realizing compatibility of three kinds of optical discs of a BD, DVD and CD.

When the first blaze structure is represented by L/M/N, L is an even integer. When the value of L is an even number of four or less, the step-difference amount of the second basic structure does not become excessively large, which is preferable because manufacturing process becomes easy, a loss of light amount caused by manufacturing error can be controlled, and fluctuation of diffraction efficiency caused when wavelength changes.

Further, in a portion of the second basic structure arranged at least around the optical axis in the central area, its step differences face the direction to the optical axis. A portion of the second basic structure arranged "at least around the optical axis in the central area" means at least a step difference at the closest position to the optical axis among step differences in which the above L becomes an even number. Preferably, at least step differences having the above L being an even number and existing in an area between the optical axis and the half position, measured in the direction perpendicular to the optical axis, of the area from the optical axis to the boundary of the central area and the peripheral area, face the direction to the optical axis. Preferably, all the step differences of the second basic structure arranged in the central area face the direction to the optical axis.

Accordingly, when the first blaze structure which generates odd-diffraction-order diffracted light for the first light flux and includes step differences at least around the optical axis in the central area facing the direction opposite to the optical axis, is overlapped with the second blaze structure which generates even-diffraction-order diffracted light for the first light flux and includes step differences at least around the optical axis in the central area facing the direction to the optical axis, height of step differences formed after they are overlapped is controlled not to be high, compared with the case that the first blaze structure and the second blaze structure are overlapped together such that their step differences face the same direction. Thereby, loss of a light amount caused by manufacturing error can be controlled and fluctuation of diffraction efficiency caused when wavelength changes can be controlled.

Further, there can be provided an objective lens with light utilization efficiencies which are maintained to be high and are well-balanced for any of three types of optical discs of a BD, DVD, and CD. Additionally, by making the step differences of the first blaze structure face the direction opposite to the optical axis, aberrations can be varied in the direction of under (under-correction) when the wavelength changes to be longer. Thereby, aberrations generated when the temperature of the optical pickup apparatus rises can be reduced. Further, under the condition that the objective lens is made of plastic, an objective lens which can maintain a stable performance even when the temperature changes can be provided.

A more preferable first diffractive structure described in 4) is a structure in which a first blaze structure with $|X|/|Y|/|Z|$ being 1,1,1 and a second blaze structure with $|L|/|M|/|N|$ being 2,1,1 are overlapped together. When such the first diffractive structure is formed, height of step differences can be very low. Accordingly, manufacturing error can be controlled to be smaller, loss of a light amount caused by manufacturing error can be controlled, and fluctuation of diffraction efficiency caused when wavelength changes can be controlled.

From the view point of shape and step-difference amount of the first optical path difference providing structure formed by overlapping the first blaze structure and the second blaze structure, the first optical path difference providing structure formed by overlapping the first basic structure in which $|X|/|Y|/|Z|$ are 1,1,1, and the second blaze structure in which $|L|/|M|/|N|$ are 2,1,1 together, can be represented as followings. A portion of the first diffractive structure arranged at least around the optical axis in the central area includes both of a step difference facing the direction opposite to the optical axis and a step difference facing the direction to the optical axis, and step-difference amount d11 of a step difference facing the direction opposite to the optical axis and step-difference amount d12 of a step difference facing the direction to the optical axis are preferably satisfy the following conditional expressions (13) and (14). More preferably, the conditional expressions (13) and (14) axe satisfied within the entire of the central area. When the objective lens on which a diffractive structure is formed is a single lens that has an aspheric surface and convex lens, an incident angle of a light flux at the objective lens changes depending on the height from the optical axis. Therefore, in an optical path difference providing structure providing the same optical path difference, there is a trend that a step-difference amount becomes larger generally at the position being farther from the optical axis. In the following expressions, the upper limit is multiplied by 1.5 because such the increase of the step difference amount is considered.

$$0.6\cdot(\lambda1/(n-1))<d11<1.5\cdot(\lambda1/(n-1)) \quad (13)$$

$$0.6\cdot(\lambda1/(n-1))<d12<1.5\cdot(2\lambda1/(n-1)) \quad (14)$$

In these expressions, n is a refractive index of the objective lens for the first wavelength $\lambda1$.

A portion of the first diffractive structure arranged "at least around the optical axis in the central area" means an optical path difference providing structure including both of a step difference facing the direction opposite to the optical axis and a step difference facing the direction to the optical axis. Preferably, it means a diffractive structure having step differences existing in at least an area between the optical axis and the half position, measured in the direction perpendicular to the optical axis, of the area from the optical axis to the boundary of the central area and the peripheral area.

Further, for example, when $\lambda1$ is 390-415 nm (0.390-0.415 µm) and n is 1.54-1.60, the aforesaid conditional expressions can be expressed as follows.

$$0.39\,\mu m<d11<1.15\,\mu m \quad (15)$$

$$0.39\,\mu m<d12<2.31\,\mu m \quad (16)$$

As a way to overlap the first blaze structure and the second blaze structure, it is preferable to adjust the first blaze structure and the second blaze structure in terms of pitch, and adjust the positions of all the step differences of the second blaze structure and positions of the step differences of the first blaze structure, or adjust the positions of all the step differences of the first blaze structure and positions of the step differences of the second blaze structure.

When the first blaze structure and the second blaze structure are overlapped together so that the positions of all the step differences of the second blaze structure may agree with positions of the step differences of the first blaze structure, as described above, the values of d11 and d12 of the first diffractive structure preferably satisfy the following conditional expressions (13)' and (14)'.

$$0.6\sim(\lambda1/(n-1))<d11<1.5\cdot(\lambda1/(n-1)) \quad (13)'$$

$$0.6\cdot(\lambda1/(n-1))<d12<1.5\cdot(\lambda1/(n-1)) \quad (14)'$$

More preferably, the conditional expressions (13)' and (14)' are satisfied in the entire of the central area.

Further, for example, when $\lambda1$ is 390-415 nm (0.390-0.415 µm) and n is 1.54-1.60, the aforesaid conditional expressions can be expressed as follows.

$$0.39\,\mu m<d11<1.15\,\mu m \quad (15)'$$

$$0.39\,\mu m<d12<1.15\,\mu m \quad (16)'$$

It is more preferable that the following conditional expressions (13)" and (14)" are satisfied.

$$0.9\cdot(\lambda1/(n-1))<d11<1.5\cdot(\lambda1/(n-1)) \quad (13)''$$

$$0.9\cdot(\lambda1/(n-1))<d12<1.5\cdot(\lambda1/(n-1)) \quad (14)''$$

It is more preferable that conditional expressions (13)" and (14)" are satisfied in the entire of the central area.

Further, for example, when $\lambda1$ is 390-415 µm (0.390-0.415 µm) and n is 1.54-1.60, the aforesaid conditional expressions can be expressed as follows.

$$0.59\,\mu m<d11<1.15\,\mu m \quad (15)''$$

$$0.59\,\mu m<d12<1.15\,\mu m \quad (16)''$$

By forming the first diffractive structure by overlapping the first blaze structure in which $|X|$, $|Y|$, and $|Z|$ are 1, 1, and 1, respectively and the second blaze structure in which $|L|$, $|M|$, and $|N|$ are 2, 1, and 1, respectively, the first blaze structure makes aberrations under (under-corrected), in other words, makes wavelength characteristics under, when a wavelength becomes longer, and the second blaze structure makes aberrations over (over-corrected), in other words, makes wavelength characteristics over, when the wavelength becomes longer. Therefore, the wavelength characteristics does not become excessively great in the under direction and does not become excessively great in the over direction, which enables to obtain the wavelength characteristics being under at the best level. The "wavelength characteristics being under at the best level" preferably represents that the absolute value in terms of λrms is 150 or less. It is preferable from the viewpoint that an aberration change caused when the temperature changes can be controlled to be small, even when the objective lens is made of plastic.

As described above, it is preferable that contribution of the first blaze structure is dominant, compared with the second blaze structure in view point of obtaining "wavelength characteristics being under at the best level". It is preferable that the average pitch of the first blaze structure is smaller than the average pitch of the second blaze structure in view point that contribution of the first blaze structure makes dominant, compared with the second blaze structure. In other words, it may be said that pitch of step differences facing the direction opposite to the optical axis is smaller than pitch of step differences facing the direction to the optical axis, and also may be said that the number of step differences facing the direction opposite to the optical axis is larger than the number of step differences facing the direction to the optical axis in the first diffractive structure. It is preferable that the average pitch of the first blaze structure is ¼ or less than the average pitch of the second blaze structure. It is more preferable that it is ⅙ or less. By defining the average pitch of the first blaze structure to be ¼ or less (preferably, ⅙ or less) of the average pitch of the second blaze structure, it can provide the "wavelength characteristics being under at the best level" as described above, and it is preferable in view point that a working distance for a CD can be sufficiently secured. In other words, it may be said that, in the first diffractive structure in the central area, the number of step differences facing the direction opposite to the optical axis is four times or more of the number of step differences facing the direction to the optical axis. It is more preferably 6 times or more.

Further, it is preferable that the minimum pitch is 15 μm or less in the first diffractive structure described in 4). It is more preferably 10 μm or less. Further, it is preferable that the average pitch of the first diffractive structure is 30 μm or less. It is more preferably 20 μm or less. By providing such the structure, it enables to obtain the wavelength characteristics being under at the best level as described above, and a best focus position of wanted light, where the wanted light is used for recording and for reproducing information for the third optical disc and generated in the third light flux which has passed through the first diffractive structure, can be separated away from a best focus position of unwanted light which is not used for recording and/or reproducing information for the third optical disc. Further, it enables to reduce detection errors. Herein, the average pitch is a value obtained by adding all the pitches of the first diffractive structure in the central area and dividing the sum by the number of step differences in the first diffractive structure in the central area.

The foregoing is an explanation about the aforesaid items 1)-4) which are the preferable examples of the first diffractive structure.

Meanwhile, it is preferable that the diffractive structure or the basic structure is a structure in which a certain unit shape is repeated periodically. The expression "a unit shape is repeated periodically" in the present description naturally involves a shape in which the same shape is repeated on the constant cycle. Further, a structure in which "a unit shape is repeated periodically" also involves a shape such that a unit shape provided as one unit of the cycle changes regularly such that its cycle is gradually elongated or shortened.

When the diffractive structure or the basic structure includes a blaze structure, there is formed a shape in which serrated shape representing a unit shape is repeated. It may have a shape in which the same serrated shape is repeated as shown in FIG. 2a, or a shape in which the size of the serrated shape becomes larger or smaller gradually as its position goes in the direction of the base surface as shown FIG. 2b. Further, it may have shape in which the shape including serrated shapes gradually becoming larger and the shape including serrated shapes gradually becoming smaller are combined. In these shapes, it is preferable that the sizes of step-difference amounts along the optical axis direction (or the direction of traveling light) are not almost changed in the serrated shape, even when the sizes of the serrated shapes change gradually. In the blaze structure, a length in the direction of the optical axis of one serrated shape (which may by a length in the direction of a ray passing through the serrated shape) is referred as a pitch depth, and a length in the direction perpendicular to the optical axis of one serrated shape is referred as a pitch width. Additionally, there can be provided the shape that step differences of the blaze structure face the side opposite to the optical axis (center) in a certain area, step differences of the blaze structure face the side of the optical axis (center) in the other area, and a transition area which is required to switch the orientation of step differences of the blaze structure is positioned between those areas. The transition area is an area corresponding to a point that represents the extreme value of an optical path difference function where the optical path difference added by the diffractive structure is represented by the optical path difference function. When the optical path difference function includes an extreme value, a slope of the optical path difference function becomes small, which enables the pitch offing-shaped surfaces to be wide and controls a deterioration of transmittance caused by form errors of the diffractive structure.

When the diffractive structure or the basic structure includes a step structure, there is formed a shape in which step shape representing a unit shape is repeated. There can be formed a shape in which the same small-step shape with several steps as shown in FIG. 2c (for example, a step with five divided portions (5 steps) as shown in FIG. 2c) is repeated. Further, there may be taken a shape wherein size of steps becomes gradually greater or smaller as a position of the surface goes in the direction of the base surface. In these structures, it is preferable that the size in the optical axis direction (or in the direction of rays passing through) is not almost changed.

When the diffractive structure includes a binary shape as shown in FIG. 2d (such the structure may be called a step structure with two divided portions (two steps)), there may be taken a shape wherein size of binaries becomes gradually greater or size of steps becomes gradually small as a position of the surface goes in the direction of the base surface. In these structures, it is preferable that the size in the direction of rays passing through it is not almost changed.

The second diffractive structure arranged in the peripheral area of the objective lens and the first diffractive structure arranged in the central area may be placed on the different optical surfaces of the objective lens, but they are preferably placed on the same optical surface. By placing them on the same optical surface, decentration error under the manufacturing process can be reduced, which is preferable. The first diffractive structure and the second diffractive structure may be arranged on the surface facing the light source in the objective lens, rather than the surface facing the optical disc in the objective lens.

The objective lens converges the first light flux, the second light flux and third light flux which have passed through the central area in the objective lens where the first diffractive structure is formed, to form respective converged spots. Preferably, the objective lens converges the first light flux which has passed through the central area in the objective lens where the first diffractive structure is formed, so as to be capable of recording and reproducing of information on an information recording surface of the first optical disc. The objective lens converges the second light flux which has passed through the central area in the objective lens where the first diffractive structure is formed, so as to be capable of recording and reproducing of information on an information recording surface of the second optical disc. The objective lens converges the third light flux which has passed through the central area in the objective lens where the first diffractive structure is formed, so as to be capable of recording and reproducing of information on an information recording surface of the third optical disc. When thickness t1 of a protective substrate of the first optical disc is different from thickness t2 of a protective substrate of the second optical disc, it is preferable that the first diffractive structure corrects the first light flux and the second light flux which have passed through the first diffractive structure in terms of spherical aberration generated from a difference between thickness t1 of the protective substrate of the first optical disc and thickness t2 of the protective substrate of the second optical disc and/or spherical aberration generated from a difference in wavelength between the first light flux and the second light flux. Further, it is preferable that the first diffractive structure corrects the first light flux and the third light flux which have passed through the first diffractive structure in terms of spherical aberration generated from a difference between thickness t1 of the protective substrate of the first optical disc and thickness t3 of the protective substrate of the third optical disc and/or spherical aberration generated from a difference in wavelength between the first light flux and the third light flux.

The following conditional expression (17) is preferably satisfied, where f1 (mm) is a focal length for the first light flux of the objective lens, and d (mm) is a center thickness of the objective lens.

$$0.8 \leq d/f1 \leq 1.7 \tag{17}$$

Further, the following conditional expression (17)' is more preferably satisfied.

$$1.0 \leq d/f1 \leq 1.5 \tag{17}'$$

According to the above structure, it does not makes pitches of the diffractive structure small, allows to secure a working distance for a CD as the third optical disc, and makes a manufacturing process of the objective lens easy, and further enables to keep a light utilization efficiency high. Further, astigmatism and decentration coma can be reduced.

Further, the following conditional expression is preferably satisfied.

$$2.0 \text{ mm} \leq \phi \leq 4.2 \text{ mm}$$

In the expression, $\phi$ represents an effective aperture of the objective lens under the condition that the second optical disc is used. When the above range is satisfied, a change of aberrations due to a change of temperature can be maintained to be a level which causes no problem, even when the objective lens is a plastic lens, with a working distance for a CD as the third optical disc being maintained to be a distance in a level which causes no problem to practical use.

The objective lens converges the first light flux and the second light flux which have passed through the peripheral area to form respective converged spots by using the second diffractive structure formed on the objective lens. Preferably, the objective lens converges the first light flux which has passed through the peripheral area in the objective lens where the second diffractive structure is formed, so as to be capable of recording and reproducing of information on an information recording surface of the first optical disc. Further, when the second diffractive structure is formed on the objective lens, the second light flux is converged to form a converged spot so as to be capable of recording and reproducing of information on an information recording surface of the second optical disc, by using the second diffractive structure. The second diffractive structure preferably corrects chromatic spherical aberration generated by a difference in wavelength between the first light flux and the second light flux which have passed through the second diffractive structure.

As a preferred embodiment, there is cited an embodiment that the third light flux which has passed through the peripheral area is not used for recording and/or reproducing information for the third optical disc. It is preferable that the third light flux which has passed through the peripheral area does not contribute toward forming a converged spot on the information recording surface of the third optical disc. In other words, the third light flux which has passed through the peripheral area is preferably formed into flare light on the information recording surface of the third optical disc, by the second diffractive structure. As shown in FIG. 4, in a spot formed on an information recording surface of the third optical disc by the third light flux which has passed through the objective lens, there are preferably provided, in order from the optical-axis side (or from the central portion of the spot), central spot portion SCN with the largest density of a light amount, intermediate spot portion SMD with a density of a light amount being smaller than that of the central spot portion, and peripheral spot portion SOT with a density of a light amount being larger than that of the intermediate spot portion and being smaller than that of the central spot portion. The central spot portion is used for recording and/or reproducing information on an optical disc, and the intermediate spot portion and the peripheral spot portion are not used for recording and/or reproducing information on an optical disc. In the above descriptions, the peripheral spot portion is described as flare light. Alternatively, in a type that the peripheral spot portion exists around the central spot potion without the existence of the intermediate spot portion, namely, in the case that a spot which is weak and extends largely is formed around the central spot portion, such the peripheral spot area is called as flare light. In other words, the third light flux which has passed through the second diffractive structure forms a peripheral spot portion on an information recording surface of the third disc.

There is cited an embodiment that the first light flux which has passed through the most peripheral area is used for recording and/or reproducing information on the first optical disc, and that the second light flux and the third light flux which have passed through the most peripheral area are not used for recording and/or reproducing information on the second optical disc and the third optical disc, respectively. It is preferable that each of the second light flux and the third light flux which have passed through the most peripheral area does not contribute toward forming a converged spot on a corresponding information recording surface of the second optical disc or the third optical disc. Namely, when the objective lens includes the most peripheral area, it is preferable that each of the second light flux and the third light flux which have passed through the most peripheral area forms flare light on a corresponding information recording surface of the second optical disc or the third optical disc. In other words, it is preferable that each of the second light flux and the third light flux which have passed through the most peripheral area forms a peripheral spot portion on a corresponding information recording surface of the second optical disc or the third optical disc.

When the first basic structure and the second basic structure are overlapped together to form the second diffractive structure, it can make all the outgoing light fluxes of the first light flux, the second light flux, and the third light flux which have passed through the second diffractive structure, different from each other. Therefore, even when the all light flux of the first light flux, the second light flux, and the third light flux enter the objective lens at the same image-forming magnification (for example, as parallel light fluxes for the all), aberrations caused by a use of different types of optical discs can be corrected, which realizes compatibility.

When the objective lens is a plastic lens, the second diffractive structure may be formed by further overlapping the third basic structure as a structure for correcting temperature characteristics with the first basic structure or the first and second basic structures. Alternatively, it is formed in the most peripheral area. Specifically, it is preferable that a step-difference amount in the optical axis direction of the third basic structure is a step-difference amount so as to give an optical path difference equivalent to about 10 wavelengths of the first wavelength to the first light flux, give an optical path difference equivalent to about 6 wavelengths of the second wavelength to the second light flux, and give an optical path difference equivalent to about 5 wavelengths of the third wavelength to the third light flux, or is a step-difference amount so as to give an optical path difference equivalent to about 5 wavelengths of the first wavelength to the first light flux, give an optical path difference equivalent to about 3 wavelengths of the second wavelength to the second light flux, and give an optical path difference equivalent to about 2 wavelengths of the third wavelength to the third light flux.

When the objective lens is a plastic lens, the first diffractive structure may be formed by overlapping a basic structure as a structure for correcting temperature characteristics with the existing structure. Specifically, it is preferable that a step-difference amount in the optical axis direction of the third basic structure is a step-difference amount so as to give an optical path difference equivalent to about 10 wavelengths of the first wavelength to the first light flux, give an optical path difference equivalent to about 6 wavelengths of the second wavelength to the second light flux, and give an optical path difference equivalent to about 5 wavelengths of the third wavelength to the third light flux.

As stated above, it is preferable that a step-difference amount is not too large. When a step difference-amount of a certain ring-shaped zone in a basic diffractive structure obtained by overlapping plural basic structures together is higher than a standard value, it is possible to reduce the step-difference amount that is too large, without affecting optical efficiencies, by lowering the step-difference amount of the ring-shaped zone by $10 \cdot \lambda 1/(n-1)$ (μm). Incidentally, it is possible to establish an arbitral value as a standard value, but it is preferable to establish a standard value of $10 \cdot \lambda 1/(n-1)$ (μm).

Further, from the viewpoint that long and slender ring-shaped zones in less quantity are desirable for a manufacturing process, it is preferable that a value of "step-difference amount"/"level width" is 1 or less in all ring-shaped zones in the first diffractive structure, and aforesaid value of 0.8 or less is more preferable. It is more preferable that a value of "step-difference amount"/"level width" is 1 or less for all ring-shaped zones in all the diffractive structures, and the value of 0.8 or less is more preferable.

The image-side numerical aperture of the objective lens, necessary for reproducing and/or recording information for the first optical disc, is defined as NA1. The image-side numerical aperture of the objective lens, necessary for reproducing and/or recording for the information to the second optical disc, is defined as NA2 (NA1>NA2). The image side numerical aperture of the objective lens, necessary for reproducing and/or recording information for the third optical disc is defined as NA3 (NA2>NA3). NA1 is preferably 0.6 or more, and 0.9 or less. It is especially preferably NA1 is 0.85. NA2 is preferably 0.55 or more, and is 0.7 or less. It is especially preferable that NA2 is 0.60 or 0.65. NA3 is preferably 0.4 or more, and is 0.55 or less. It is especially preferable that NA3 is 0.45 or 0.53.

It is preferable that the border of the central area and the peripheral area in the objective lens is formed in a portion corresponding to the range being 0.9·NA3 or more and being 1.2·NA3 or less (more preferably, 0.95·NA3 or more, and 1.15·NA3 or less) under the condition that the third light flux is used. More preferably, the border of the central area and the peripheral area of the objective lens is formed in a portion corresponding to NA3. Further, it is preferable that the border of the peripheral area and the most peripheral area of the objective lens is formed in a portion corresponding to the range being 0.9·NA2 or more, and being 12·NA2 or less (more preferably, being 0.95·NA2 or more, and being 1.15·NA2 or less) under the condition that the second light flux is used. More preferably, the border of the peripheral area and the most peripheral area of the objective lens is formed in a portion corresponding to NA2.

When the third light flux passing through the objective lens is converged on the information recording surface of the third optical disc, it is preferable that spherical aberration has at least one discontinuous portion. In that case, it is preferable that the discontinuous portion exists in the range being 0.9·NA3 or more, and being 1.2·NA3 or less (more preferably, being 0.95·NA3 or more, and being 1.15·NA3 or less) under the condition that the third light flux is used.

Further, when the spherical aberration is continuous and does not have the discontinuous portion, and when the third light flux passing through the objective lens is converged on the information recording surface of the third optical disc, it is preferable that the absolute value of the longitudinal spherical aberration is 0.03 μm or more in NA2, and the absolute value of the longitudinal spherical aberration is 0.02 μm or less in NA3. More preferably, the absolute value of the longitudinal spherical aberration is 0.08 μm or more in NA2, and the absolute value of the longitudinal spherical aberration is 0.01 μm or less in NA3.

Further, corresponding to the use of the optical pickup apparatus, diffraction efficiencies of the central area for respective wavelengths can be set properly. For example, in the case of the optical pickup apparatus which records and reproduces information for the first optical disc, and which just reproduces information for the second and the third optical discs, it is preferable that the diffraction efficiencies of the central area and/or the peripheral area are defined with considering primarily the diffraction efficiencies for the first light flux. On the other hand, in the case of the optical pickup apparatus which only reproduces information for the first optical discs and which records and reproduces information for the second and third optical discs, it is preferable that the diffraction efficiencies of the central area is defined with considering primarily the diffraction efficiencies for the second and third light fluxes and the diffraction efficiencies of the peripheral area is defined with considering primarily the diffraction efficiency for the second light flux.

In any of the above cases, when the following conditional expression (18) is satisfied, the diffraction efficiency of the first light flux calculated by the area-weighted mean can be secured high.

$$\eta 11 \leq \eta 21 \tag{18}$$

In the expression, η11 expresses a diffraction efficiency of the first light flux in the central area, and η21 expresses a diffraction efficiency of the first light flux in the peripheral area. Hereupon, when the diffraction efficiencies of the central area is defined with considering primarily the light fluxes with the second and the third wavelengths, the diffraction efficiency of the first light flux of the central area is decreased. However, in the case where the numerical aperture of the first optical disc is larger than the numerical aperture of the third optical disc, when considered on the whole effective aperture of the first light flux, the decrease of diffraction efficiency in the central area does not give so much large influence.

Hereupon, the diffraction efficiency in the present specification can be defined as follows.
(1) The transmittance of an objective lens having the same focal length, the same lens thickness, and the same numerical aperture, being formed of the same material, and excluding the first and the second diffractive structures, is measured for the central area and the peripheral area separately. In this case, the transmittance of the central area is measured with the light flux which enters into the peripheral area being shielded, and the transmittance of the peripheral area is measured with the light flux which enters into the central area being shielded.
(2) The transmittance of the objective optical lens including the first and the second diffractive structures is measured for the central area and the peripheral area separately.
(3) The diffraction efficiencies of both areas are obtained by dividing the results of (2) is divided by the respective results of (1).

Further, it can be configured to make light utilization efficiencies of any two of the first through three light fluxes 70% or more, and to make a light utilization efficiency of the rest light flux 30% or more and 70% or less. Alternatively, the light utilization efficiency of the rest light flux is made to be 40% or more and 60% or less. In this case, the light flux exhibiting the light utilization efficiency of the rest light flux is made to be 30% or more and 70% or less (or made to be 40% or more and 60% or less) is preferably the third light flux.

Incidentally, the light utilization efficiency mentioned here is defined to be calculated by $\text{NB}$, where A represents a light amount within an airy disc of a converged spot formed on an information recording surface of an optical disc by the objective lens on which the first diffractive structure and the second diffractive structure are formed, and B represents a light amount within an airy disc of a converged spot formed on an information recording surface of an optical information recording medium by the objective lens formed by the same material, having the same focal length, the same thickness on the axis, the same numerical aperture and same wavefront aberration, and on which the first diffractive structure and the second diffractive structure are not formed. Meanwhile, the airy disc mentioned here means a circle having radius r' whose center is on the optical axis of a converged spot. It is expressed by $r'=0.61 \cdot \lambda / NA$.

The first light flux, the second light flux, and the third light flux may enter the objective lens as parallel light fluxes, or may enter the objective lens as divergent light fluxes or convergent light fluxes. When the first light flux enters the objective lens as a parallel light flux or a almost parallel light flux, the image-forming magnification m1 of the objective lens when the first light flux enters the objective lens, satisfies the expression (1).

$$-0.02 \leq m1 \leq 0.02 \tag{1}$$

It is more preferable that m1 is zero.
On the one hand, when the first light flux enters the objective lens as a divergent light flux, the image-forming magnification m1 of the objective lens when the first light flux enters the objective lens, satisfies the expression (1").

$$-0.10 < m1 \leq -0.02 \tag{1"}$$

When the second light flux enters the objective lens as a parallel or almost parallel light flux, the image-forming manufacture m2 of the objective lens when the second light flux enters the objective lens, satisfies the expression (4).

$$-0.02 \leq m2 \leq 0.02 \tag{4}$$

It is more preferable that m2 is zero.
On the one hand, when the second light flux enters the objective lens as a divergent light flux, the image-forming magnification m2 of the objective lens when the second light flux enters the objective lens, satisfies the expression (4").

$$-0.10 < m2 < 0.02 \tag{4"}$$

When the third light flux enters the objective lens as a parallel or almost parallel light flux, it is preferable that the image-forming magnification m3 of the objective lens when the third light flux enters the objective lens, satisfies the expression (5). When the third light flux is a parallel light flux, problems can be caused easily in a tracking operation. However, the present invention can provide excellent tracking characteristics even when the third light flux is a parallel light flux, and realizes recording and/or reproducing of information for three different optical discs.

$$-0.02 \leq m3 \leq 0.02 \tag{5}$$

It is more preferable that m3 is zero.
On the one hand, when the third light flux enters the objective lens as a divergent light flux, the image-forming manufacture m3 of the objective lens when the third light flux enters the objective lens, satisfies the expression (5").

It is preferable that the following expression is satisfied.

$$-0.10 < m3 \leq -0.02 \tag{5"}$$

The working distance (WD) of the objective when the third optical disc is used is preferably 0.10 mm or more, and 1.5 mm or less. It is more preferably 0.2 mm or more, and 1.20 mm or less. Next, the WD of the objective lens when the second optical disc is used is preferably 0.4 mm or more, and 1.3 mm or less. Furthermore, the WD of the objective lens when the first optical disc is used is preferably 0.4 mm or more, and 1.2 mm or less.

The optical information recording and reproducing apparatus according to the present invention, includes an optical disc drive apparatus including the above described optical pickup apparatus.

Herein, the optical disc drive apparatus installed in the optical information recording and reproducing apparatus will be described. There is provided an optical disc drive apparatus employing a system of taking only a tray which can hold an optical disc under the condition that the optical disc is mounted thereon, outside from the main body of the optical information recording and reproducing apparatus in which optical pickup apparatus is housed; and a system of taking out the main body of the optical disc drive apparatus in which the optical pickup apparatus is housed.

The optical information recording and reproducing apparatus using each of the above described systems, is generally provided with the following component members but the members are not limited to them: an optical pickup apparatus housed in a housing, a drive source of the optical pickup apparatus such as seek-motor by which the optical pickup apparatus is moved toward the inner periphery or outer periphery of the optical disc for each housing; traveling means having a guide rail for guiding the optical pickup apparatus toward the inner periphery or outer periphery of the optical disc; and a spindle motor for rotation driving of the optical disc.

The optical information recording and reproducing apparatus employing the former system is provide with, other than these component members, a tray which can hold the optical disc with the optical disc being mounted thereon, and a loading mechanism for slidably moving the tray. The optical information recording and reproducing apparatus employing the latter system does not include the tray and loading mechanism, and it is preferable that each component member is provided in the drawer corresponding to chassis which can be taken out outside.

Advantageous Effect of Invention

According to the present invention, there can be provided an objective lens and an optical pickup apparatus which can record and/or reproduce information properly for three kinds of discs with different recording densities, such as a high density disc (BD in particular), DVD and CD, even if a single lens is used as the objective lens, where the objective lens can be improved in terms of transmittance and the optical pickup apparatus is equipped with the objective lens.

Each of FIGS. 2a to 2d schematically shows sectional views wherein some examples of diffractive structures which are provided on the objective lens OBJ relating to the invention.

Figure 3A:
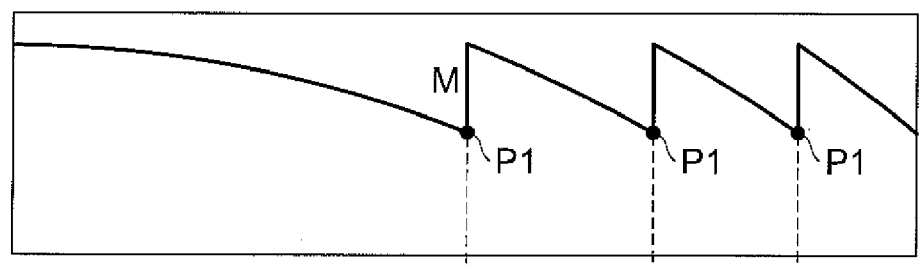
Figure 3B:
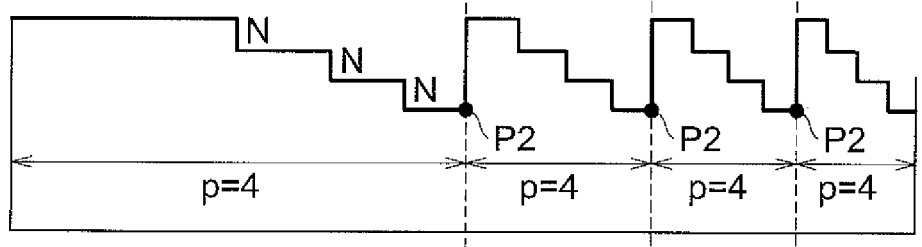
Figure 3C:
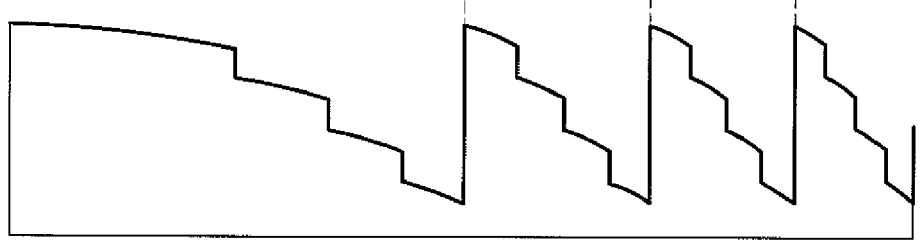

FIGS. 3a to 3c are diagrams showing overlapping of diffractive structures.

Figure 4:
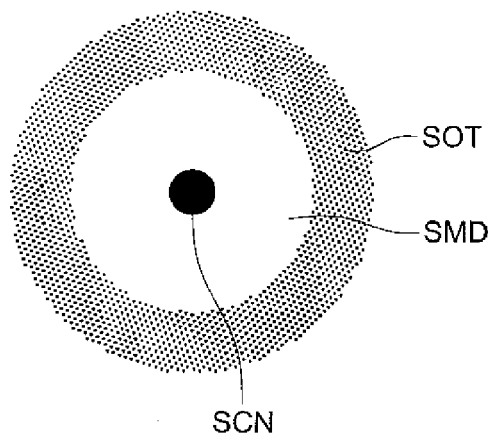

FIG. 4 is a diagram showing a form of a spot formed by the objective lens relating to the invention.

Figure 5:
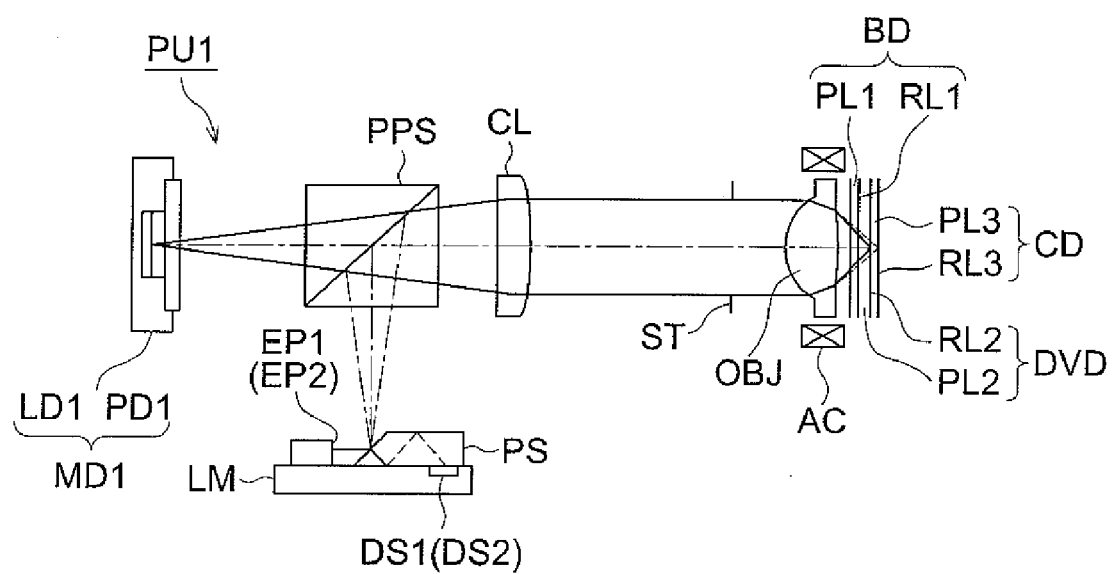

FIG. 5 is a diagram schematically showing the structure of an optical pickup apparatus relating to the invention.

Figure 6:
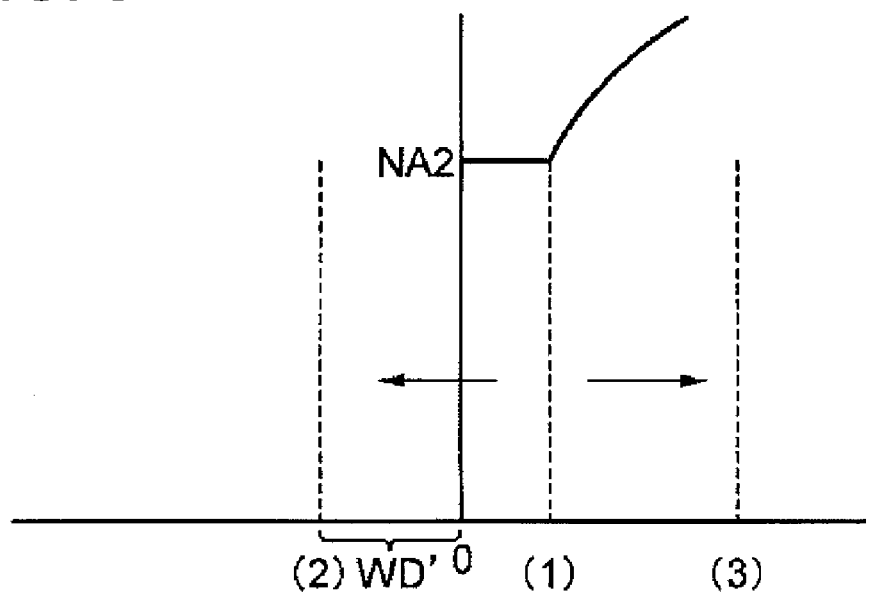

FIG. 6 is a schematic diagram with numerical aperture as the vertical axis and spherical aberration as the horizontal axis.

Figure 7:
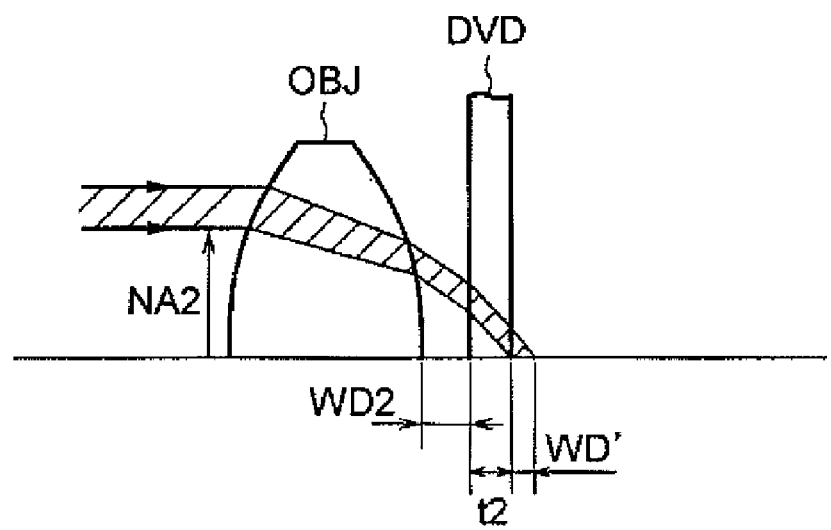

FIG. 7 is a diagram schematically showing the condition of light converging when a DVD is used as the second disc.

Figure 8:
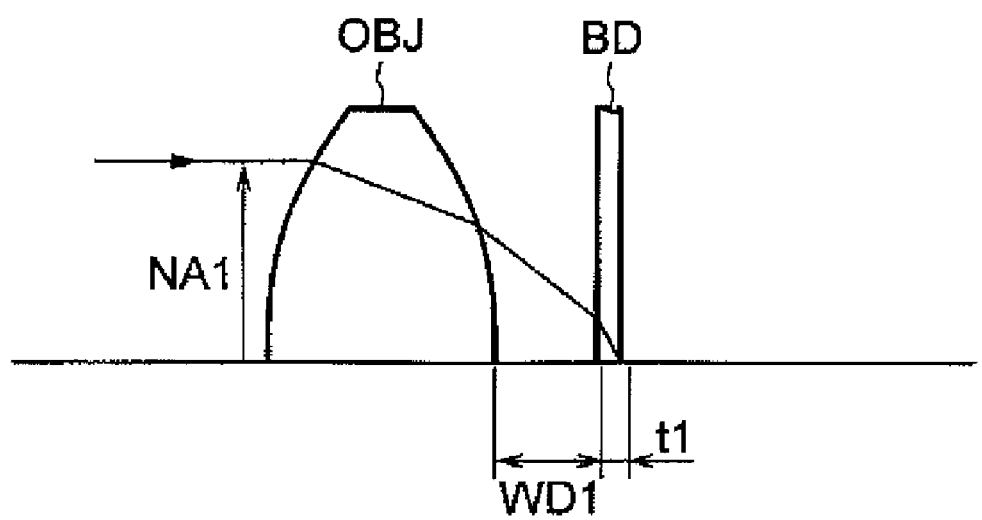

FIG. 8 is a diagram schematically showing the condition of light converging when a BD is used as the first disc.

DESCRIPTION OF EMBODIMENTS

Referring to the drawings, the embodiment of the present invention will be described below. FIG. 5 is a diagram schematically showing a construction of the optical pickup apparatus PU1 of the present embodiment capable of recording and/or reproducing information adequately for a BD, DVD and CD which are different optical discs. The optical pickup apparatus PU1 can be mounted in the optical information recording and reproducing apparatus. Herein, the first optical disc is a BD, the second optical disc is a DVD, and the third optical disc is a CD. Hereupon, the present invention is not limited to the present embodiment.

The optical pickup apparatus PU1 comprises objective lens OBJ; stop ST; collimation lens CL; dichroic prism PPS; unit MD1 provided by unitizing first semiconductor laser LD1 (the first light source) which emits a laser light flux with a wavelength of $\lambda 1 = 405$ nm (the first light flux) when recording/reproducing information for BD, and first light-receiving element PD1 which receives the reflection light from information recording surface RL1 of a BD; and laser module LM.

Further, laser module LM comprises second semiconductor laser EP1 (the second light source) which emits the laser light flux with a wavelength of $\lambda 2 = 658$ nm (the second light flux) when recording and/or reproducing information for a DVD; third semiconductor laser EP2 (the third light source) emitting the laser light flux with a wavelength of $\lambda 3 = 785$ nm (the third light flux) when recording and/or reproducing information for a CD; second light-receiving element DS1 which receives the reflection light flux from the information recording surface RL2 of a DVD; the third light-receiving element DS2 which receives the reflection light flux from the information recording surface RL3 of a CD; and prism PS.

Figure 1A:
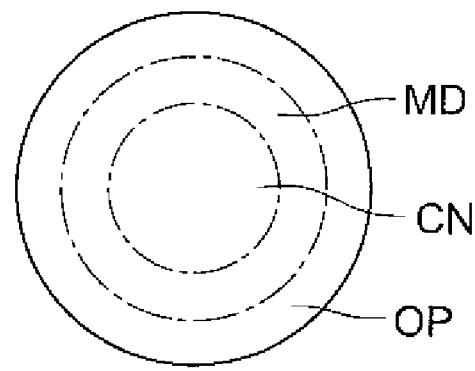
FIG. 1a is a diagram of an example of objective lens OBJ relating to the invention which is viewed in the optical axis direction.
Figure 1B:
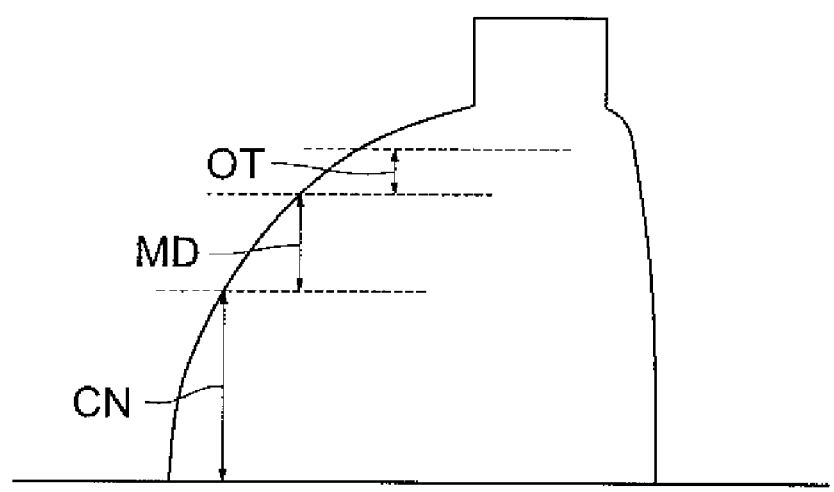
FIG. 1b is a sectional view.
Figure 2A:
Figure 2B:
Figure 2C:
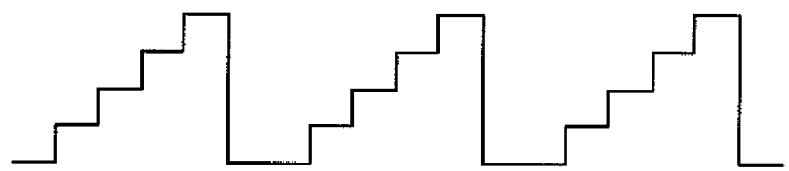
Figure 2D:
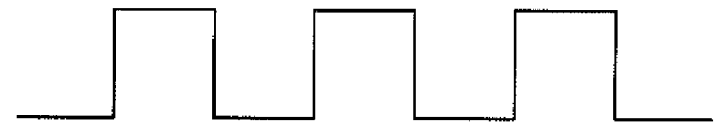

As shown in FIGS. 1a and 1b, in objective lens OBJ of the present embodiment, there are formed central area CN including the optical axis; peripheral area MD arranged around the central area and most peripheral area OT further arranged around the peripheral area which are formed concentrically around the optical axis as a center. A first diffractive structure is formed in central area CN and a second diffractive structure is formed in peripheral area MD, which are not illustrated in the figures. Further, in a most peripheral area OT, only a refractive surface is formed.

The objective lens satisfies all of the conditional expressions (1) to (5), where m1 is an image-forming magnification of the objective lens when information is reproduced and/or recoded for a BD, m2 is an image-forming magnification of the objective lens when information is reproduced and/or recoded for a DVD, m3 is an image-forming magnification of the objective lens when information is reproduced and/or receded for a CD, WD1 (mm) is a worming distance of the objective lens when information is reproduced and/or recoded for a BD, WD2 (mm) is a working distance of the objective lens when information is reproduced and/or recoded for a DVD, and WD3 (mm) is a working distance of the objective lens when information is reproduced and/or recoded for a CD.

$$-0.02 \leq m1 \leq 0.02 \tag{1}$$

$$0 \leq (WD1 - WD2) \leq 1.57m2 + 0.123 \text{ or}$$

$$1.57m2 + 0.24 \leq (WD1 - WD2) \leq 0.7 \tag{2}$$

$$0 \leq (WD1 - WD3) \leq 1.79m3 + 0.333 \text{ or}$$

$$1.66m3 + 0.508 \leq (WD1 - WD3) \leq 0.7 \tag{3}$$

$$-0.02 \leq m2 \leq 0.02 \tag{4}$$

$$-0.02 \leq m3 \leq 0.02 \tag{5}$$

When the first diffractive structure is the blaze structure descried in the above 1) or the step structure described in the above 2), there can be used a structure, for example, which makes the x-th-order diffracted light flux for the first light flux which has passed through the first diffractive structure, larger than the amounts of diffracted light fluxes of any other orders, makes the amount of the y-th-order diffracted light flux for the second light flux larger than the amounts of diffracted light fluxes of any other orders, and makes the amount of the z-th-order diffracted light for the third light flux larger than the amounts of diffracted light fluxes of any other orders, where the combination of (x, y, z) is preferably any one of (1, 1, 1), (2, 1, 1), (1, −1, −2), and (1, −2, −3). Further, it is preferable that the second diffractive structure, for example, makes the zero-th-order diffracted light flux for the first light flux which has passed through the second diffractive structure, larger than the amounts of diffracted light fluxes of any other orders, and makes the amount of the first-order diffracted light flux for the second light flux larger than the amounts of diffracted light fluxes of any other orders.

When the first diffractive structure is the structure formed by overlapping the first blaze structure and the second blaze structure together as descried in the above 4), there can be used a structure, for example, which makes the x-th-order diffracted light flux for the first light flux which has passed through the first diffractive structure, larger than the amounts of diffracted light fluxes of any other orders, makes the amount of the y-th-order diffracted light flux for the second light flux larger than the amounts of diffracted light fluxes of any other orders, and makes the amount of the z-th-order diffracted light for the third light flux larger than the amounts of diffracted light fluxes of any other orders, where the combination of (x, y, z) is preferably any one of (2, 1, 1) and (1, 1, 1).

Blue-violet semiconductor laser diode LD1 emits a first light flux (λ1=405 nm) which is a divergent light flux. The divergent light flux passes through dichroic prism PPS, and is converted into a parallel light flux by collimation lens CL. After that, the resulting light flux is converted from linear polarized light into circular polarized light by the ¼ wavelength plate which is not shown. The diameter of the converted light flux is regulated by stop ST, and the resulting light flux enters objective lens OBJ. The light flux which is converged by the central area, the peripheral area, and the most peripheral area, is formed into a spot on information recording surface RL1 of a BD through protective substrate PL1 with the thickness of 0.1 mm, then.

The reflection light flux which is modulated on the information recording surface RL1 by information pits, passes through objective lens OBJ and stop ST again, and is converted from circular polarized light into linear polarized light by the ¼ wavelength plate which is not shown. Then, collimation lens CL converts the light flux into a convergent light flux. The convergent light flux passes through dichroic prism PPS and is converged on the light receiving surface of the first light-receiving element PD1. Then, information recorded in a BD can be read based on the output signal of the first light-receiving element PD1, by focusing or tracking objective optical element OBJ using two-axis actuator AC.

Red semiconductor laser EP1 emits a second light flux (λ2=658 nm) which is a divergent light flux. The divergent light flux is reflected by prism PS and is further reflected by dichroic prism PPS. The light flux is converted into a parallel light flux by collimation lens CL. After that the collimated light flux is converted in terms of polarization by the ¼ wavelength plate which is not shown. The resulting light flux enters into objective lens OBJ. Herein, the light flux converged by the central area and the peripheral area of the objective lens OBJ (the light flux passing through the most peripheral area is made into flare light, and forms the peripheral spot portion), becomes a spot on information recording surface RL2 of a DVD through the protective substrate PL2 with a thickness of 0.6 mm.

The reflection light flux which is modulated on information recording surface RL2 by information pits, passes through objective lens OBJ and stop ST again, and is converted in terms of polarization by the ¼ wavelength plate which is not shown. Then, the resulting light flux is converted by collimation lens CL into a convergent light flux, the convergent light flux is reflected by dichroic prism PPS, then, is reflected two times in the prism, and converged on the second light receiving element DS1. Then, the information recorded in DVD can be read by using the output signal of the second light-receiving element DS1.

Infrared semiconductor laser EP2 emits the third light flux (λ3=785 nm) which is a divergent light flux. The divergent light flux is reflected by prism PS, and further reflected by dichroic prism PPS. The resulting light flux is converted by collimation lens CL into a parallel light flux. After that, the resulting light flux is converted in terms of polarization by the ¼ wavelength plate which is not shown. The converted light flux enters objective lens OJT. Herein, the light flux converged by the central area of the objective lens OBJ (the light flux passing through the peripheral area and the most peripheral area is made into flare light, and forms the peripheral spot portion), becomes a spot on information recording surface RL3 of a CD through the protective substrate PL3 with thickness of 1.2 mm.

The reflection light flux which is modulated on information recording surface RL3 by information pits, passes through objective lens OBJ and stop ST again, and is converted in terms of polarization by the ¼ wavelength plate which is not shown. Then, the resulting light flux is converted into a convergent light flux by collimation lens CL, and is reflected by dichroic prism PPS, then, is further reflected two times in the prism. The reflected light flux is converged on the third light-receiving element DS2. Then, information recorded in a CD can be read by using output signal of the third light-receiving element DS2.

EXAMPLES

Examples which can be used for the aforesaid embodiments will be explained as follows. Each of Examples 1 to 5 provides an objective optical element as a single lens. In the following tables, ri represents a curvature radius, di represents a position from the i-th surface to the (i+1)-th surface in the optical axis direction, and ni represents a refractive index of each surface. Incidentally, from now on (including lens data in Tables), the power of 10 will be expressed as by using "E" (for example, $2.5 \times 10^{-3}$ will be expressed as 2.5E-3). Each optical surface of the objective optical element is formed into an aspheric surface which is axial symmetry around the optical axis and is regulated by an expression obtained by substituting coefficients shown in the table to the expression of Math 1.

$$X(h) = \frac{(h^2/r)}{1 + \sqrt{1 - (1+k)(h/r)^2}} + \sum_{i=0}^{10} A_{2i} h^{2i}$$ [Math. 1]

Herein, X(h) represents the axis along the optical axis (the direction of traveling light is defined as a positive direction), κ is a conic constant, $A_i$ is an aspheric surface coefficient, his the height from the optical axis, and r is the paraxial curvature radius.

In Examples using a diffractive structure (phase structure), an optical path difference provided by the diffractive structure for the light flux with each wavelength is defined by an expression obtained by substituting the coefficients shown in the table into the optical path difference function represented by Math 2.

$$\Phi(h) = \lambda/\lambda_B \times dor \times \sum_{i=0}^{5} C_i h^{2i} \quad [\text{Math. 2}]$$

Herein, $\lambda$ is a wavelength of an incident light flux, $\lambda B$ is a manufacture wavelength (blaze wavelength), dor is a diffraction order number, and $C_i$ is a coefficient of the optical path difference function.

Example 1

Lens data of Example 1 are shown in Table 1 and Table 2. In Example 1, the first diffractive structure in the center area is formed by overlapping the first basic structure being a blaze structure and a second basic structure being a 5-step structure. A second-order diffracted light flux has a maximum diffraction-light amount among diffracted light fluxes generated when the first light flux enters the first basic structure (also referred as diffractive structure 1), a first-order diffracted light flux has a maximum diffraction-light amount among diffracted light fluxes generated when the second light flux enters the first basic structure, and a first-order diffracted light flux has a maximum diffraction-light amount among diffracted light fluxes generated when the third light flux enters the first basic structure. Further, a first-order diffracted light flux has a maximum diffraction-light amount among diffracted light fluxes generated when the first light flux enters the second basic structure (also referred as diffractive structure 2), a minus-second-order diffracted light flux has a maximum diffraction-light amount among diffracted light fluxes generated when the second light flux enters the second basic structure, and a minus-second-order diffracted light flux has a maximum diffraction-light amount among diffracted light fluxes generated when the third light flux enters the second basic structure. On the other hand, the second diffractive structure in the peripheral area has a 5-step step structure. A 0-th-order diffracted light flux has a maximum diffraction-light amount among diffracted light fluxes generated when the first light flux enters the second diffractive structure, and a first-order diffracted light flux has a maximum diffraction-light amount among diffracted light fluxes generated when the second light flux enters the second diffractive structure.

TABLE 1

| Specifications | | | |
|---|---|---|---|
| | BD | DVD | CD |
| Focal length f (mm) | 2.200 | 2.366 | 2.445 |
| Wavelength $\lambda$ (nm) | 405 | 658 | 785 |
| NA | 0.85 | 0.6 | 0.45 |
| Effective aperture $\phi$ (mm) | 3.740 | 2.869 | 2.224 |
| Magnification | 0 | −0.0165 | −0.0170 |
| WD | 0.717 | 0.647 | 0.447 |
| Disc thickness (mm) | 0.0875 | 0.60 | 1.10 |

| Arrangement | | | | | | | | |
|---|---|---|---|---|---|---|---|---|
| | Distance from | | BD | | DVD | | CD | |
| $i^{th}$ surface | optical axis | ri | di (405 nm) | ni (405 nm) | di (658 nm) | ni (658 nm) | di (785 nm) | ni (785 nm) | Remarks |
| 0 | | ∞ | | | 145.00 | | 145.00 | | |
| 1 Stop diameter $\phi$ (mm) | | ∞ | 0.0 (3.74) | 1.0000 | 0.0 (2.87) | 1.0000 | 0.0 (2.22) | 1.0000 | Stop |
| 2-1 | $0.000 \leq h < 1.27$ | 1.2691 | 2.6800 | 1.5592 | 2.6800 | 1.5397 | 2.6800 | 1.5363 | Aspheric surface |
| 2-2 | $1.27 \leq h < 1.443$ | 1.5429 | 0.0095 | 1.5592 | 0.0095 | 1.5397 | 0.0095 | 1.5363 | Aspheric surface |
| 2-3 | $1.443 \leq h$ | 1.5429 | 0.0095 | 1.5592 | 0.0095 | 1.5397 | 0.0095 | 1.5363 | Aspheric surface |
| 3-1 | $0 \leq h < 0.565$ | −2.5645 | 0.7170 | 1.0000 | 0.6470 | 1.0000 | 0.4470 | 1.0000 | Aspheric surface |
| 3-2 | $0.565 \leq h$ | −3.1490 | 0.0000 | 1.0000 | 0.0000 | 1.0000 | 0.0000 | 1.0000 | Aspheric surface |
| 4 | | ∞ | 0.0875 | 1.6195 | 0.6000 | 1.5773 | 1.1000 | 1.5706 | Disc |
| 5 | | ∞ | | | | | | | |

| Aspheric surface coefficient | | | | | |
|---|---|---|---|---|---|
| | $(2-1)^{th}$ surface | $(2-2)^{th}$ surface | $(2-3)^{th}$ surface | $(3-1)^{th}$ surface | $(3-2)^{th}$ surface |
| κ | −3.8828E−01 | −4.1140E−01 | −4.1140E−01 | −2.1735E+01 | −5.2465E+00 |
| A4 | −2.3933E−02 | 1.4840E−02 | 1.4840E−02 | 4.5256E−01 | 2.3685E−01 |
| A6 | 6.4480E−03 | −4.0011E−03 | −4.0011E−03 | −1.3093E+00 | −2.7224E−01 |
| A8 | −2.5556E−03 | −1.1904E−03 | −1.1904E−03 | 1.7968E+00 | 1.8277E−01 |
| A10 | 9.6439E−04 | 1.2577E−03 | 1.2577E−03 | −8.3872E−01 | −6.9121E−02 |
| A12 | −1.6793E−03 | −3.1591E−04 | −3.1591E−04 | 2.2456E−02 | 1.3070E−02 |
| A14 | 2.4303E−05 | 1.2181E−05 | 1.2181E−05 | −5.0789E−03 | −7.3549E−04 |

\* A symbol di − j (j ≠ 1) represents displacement from (di − 1)$^{th}$ surface to (di − j)$^{th}$ surface.
\* A symbol di − 1 represents displacement from (di − 1)$^{th}$ surface to d (i + 1)$^{th}$ surface.

TABLE 2

|  | $(2\text{-}1)^{th}$ surface | $(2\text{-}2)^{th}$ surface |
|---|---|---|
| Optical path difference function coefficient | | |
| Diffractive structure 1  λB (nm) | 405 | 405 |
| Order (BD/DVD/CD) | 2/1/1 | 0/1/— |
| C1 | 1.8052E−02 | 8.7918E−03 |
| C2 | −4.3847E−03 | 4.6425E−04 |
| C3 | 2.1706E−03 | −1.3101E−03 |
| C4 | 1.2244E−03 | 7.3264E−04 |
| C5 | −9.1181E−04 | −1.2118E−04 |
| Diffractive structure 2  λB (nm) | 405 | |
| Order (BD/DVD/CD) | 1/−2/−2 | |
| C1 | −4.8954E−03 | |
| C2 | 1.1087E−03 | |
| C3 | −6.9011E−04 | |
| C4 | −1.0048E−04 | |
| C5 | 1.1784E−04 | |
| Form and efficiency of diffractive structure | | |
| Diffractive structure 1  Diffraction type | Blaze type | Step type |
| Number of steps (in cycle) | — | 5 |
| BD Diffraction efficiency | 1.00 | 1.00 |
| DVD Diffraction efficiency | 0.89 | 0.87 |
| CD Diffraction efficiency | 1.00 | — |
| Diffractive structure 2  Diffraction type | Step type | |
| Number of steps (in cycle) | 5 | |
| BD Diffraction efficiency | 0.82 | |
| DV Diffraction efficiency | 0.44 | |
| C Diffraction efficiency | 0.56 | |

Example 2

Lens data of Example 2 are shown in Table 3 and Table 4. In Example 2, the first diffractive structure in the center area is formed by overlapping the first basic structure as a blaze structure and a second basic structure as a 4-step step structure. A second-order diffracted light flux has a maximum diffraction-light amount among diffracted light fluxes generated when the first light flux enters the first basic structure, a first-order diffracted light flux has a maximum diffraction-light amount among diffracted light fluxes generated when the second light flux enters the first basic structure, and a first-order diffracted light flux has a maximum diffraction-light amount among diffracted light fluxes generated when the third light flux enters the first basic structure. Further, a second-order diffracted light flux has a maximum diffraction-light amount among diffracted light fluxes generated when the first light flux enters the second basic structure (also referred as diffractive structure 2), a zero-th-order diffracted light flux has a maximum diffraction-light amount among diffracted light fluxes generated when the second light flux enters the second basic structure, and a minus-first-order diffracted light flux has a maximum diffraction-light amount among diffracted light fluxes generated when the third light flux enters the second basic structure. On the other hand, the second diffractive structure in the peripheral area has a 5-step step structure. A 0-th-order diffracted light flux has a maximum diffraction-light amount among diffracted light fluxes generated when the first light flux enters the second diffractive structure, and a first-order diffracted light flux has a maximum diffraction-light amount among diffracted light fluxes generated when the second light flux enters the second diffractive structure.

TABLE 3

Specifications

|  | BD | DVD | CD |
|---|---|---|---|
| Focal length f (mm) | 2.200 | 2.365 | 2.486 |
| Wavelength λ (nm) | 405 | 658 | 785 |
| NA | 0.85 | 0.6 | 0.45 |
| Effective aperture φ (mm) | 3.740 | 2.878 | 2.270 |
| Magnification | 0 | −0.02 | −0.0210 |
| WD | 0.646 | 0.566 | 0.416 |
| Disc thickness (mm) | 0.0875 | 0.60 | 1.10 |

Arrangement

| $i^{th}$ surface | Distance from optical axis | ri | BD di (405 nm) | BD ni (405 nm) | DVD di (658 nm) | DVD ni (658 nm) | CD di (785 nm) | CD ni (785 nm) | Remarks |
|---|---|---|---|---|---|---|---|---|---|
| 0 | | ∞ | | | 120.00 | | 120.00 | | |
| 1 Stop diameter φ (mm) | | ∞ | 0.0 (3.74) | 1.0000 | 0.0 (2.88) | 1.0000 | 0.0 (2.27) | 1.0000 | Stop |
| 2-1 | 0.000 ≦ h < 1.33 | 1.5201 | 2.6800 | 1.5592 | 2.6800 | 1.5397 | 2.6800 | 1.5363 | Aspheric surface |
| 2-2 | 1.33 ≦ h < 1.45 | 1.4942 | 0.0066 | 1.5592 | 0.0066 | 1.5397 | 0.0066 | 1.5363 | Aspheric surface |
| 2-3 | 1.45 ≦ h | 1.4942 | 0.0066 | 1.5592 | 0.0066 | 1.5397 | 0.0066 | 1.5363 | Aspheric surface |
| 3-1 | 0 ≦ h < 0.564 | −3.0745 | 0.6463 | 1.0000 | 0.5662 | 1.0000 | 0.4165 | 1.0000 | Aspheric surface |
| 3-2 | 0.564 ≦ h | −2.6226 | 0.0000 | 1.0000 | 0.0000 | 1.0000 | 0.0000 | 1.0000 | Aspheric surface |
| 4 | | ∞ | 0.0875 | 1.6195 | 0.6000 | 1.5773 | 1.1000 | 1.5706 | Disc |
| 5 | | ∞ | | | | | | | |

Aspheric surface coefficient

|  | $(2\text{-}1)^{th}$ surface | $(2\text{-}2)^{th}$ surface | $(2\text{-}3)^{th}$ surface | $(3\text{-}1)^{th}$ surface | $(3\text{-}2)^{th}$ surface |
|---|---|---|---|---|---|
| κ | −3.9251E−01 | −4.1235E−01 | −4.1235E−01 | −2.0827E+01 | −1.0031E+01 |
| A4 | −1.4836E−02 | 1.6021E−02 | 1.6021E−02 | −8.4095E−02 | 2.4013E−01 |
| A6 | 3.8516E−03 | −5.5225E−03 | −5.5225E−03 | 8.1609E−01 | −2.6143E−01 |
| A8 | −1.1910E−03 | −1.1776E−03 | −1.1776E−03 | −9.8378E−01 | 1.7449E−01 |
| A10 | 2.7733E−03 | 1.3457E−03 | 1.3457E−03 | −1.5151E−01 | −6.7958E−02 |

TABLE 3-continued

| | | | | |
|---|---|---|---|---|
| A12 | −7.8160E−04 | −3.0639E−04 | −3.0639E−04 | 3.2977E−02 | 1.4740E−02 |
| A14 | 0.0000E+00 | 1.1855E−05 | 1.1855E−05 | 0.0000E+00 | −1.3697E−03 |

* A symbol di − j (j ≠ 1) represents displacement from (di − 1)$^{th}$ surface to (di − j)$^{th}$ surface.
* A symbol di − 1 represents displacement from (di − 1)$^{th}$ surface to d (i + 1)$^{th}$ surface.

TABLE 4

| | | (2-1)$^{th}$ surface | (2-2)$^{th}$ surface |
|---|---|---|---|
| Optical path difference function coefficient | | | |
| Diffractive structure 1 | λB (nm) | 405 | 405 |
| | Order (BD/DVD/CD) | 2/1/1 | 0/1/— |
| | C1 | −3.1452E−04 | 7.6504E−03 |
| | C2 | −2.2832E−03 | 2.4109E−03 |
| | C3 | 8.4918E−04 | −2.2921E−03 |
| | C4 | −2.4725E−05 | 8.3678E−04 |
| | C5 | 1.8094E−04 | −1.0964E−04 |
| Diffractive structure 2 | λB (nm) | 405 | |
| | Order (BD/DVD/CD) | 2/0/−1 | |
| | C1 | −6.8766E−03 | |
| | C2 | −6.5765E−04 | |
| | C3 | 3.0534E−04 | |
| | C4 | 6.8221E−04 | |
| | C5 | −3.5639E−04 | |
| Form and efficiency of diffractive structure | | | |
| Diffractive structure 1 | Diffraction type | Blaze type | Step type |
| | Number of steps (in cycle) | — | 5 |
| | BD Diffraction efficiency | 1.00 | 1.00 |
| | DVD Diffraction efficiency | 0.89 | 0.87 |
| | CD Diffraction efficiency | 1.00 | — |
| Diffractive structure 2 | Diffraction type | Step type | |
| | Number of steps (in cycle) | 4 | |
| | BD Diffraction efficiency | 0.72 | |
| | DV Diffraction efficiency | 0.66 | |
| | C Diffraction efficiency | 0.61 | |

Example 3

Lens data of Example 3 are shown in Table 5 and Table 6. In Example 3, the first diffractive structure in the center area is formed by overlapping the first basic structure as a blaze structure and a second basic structure as a 3-step step structure. A second-order diffracted light flux has a maximum diffraction-light amount among diffracted light fluxes generated when the first light flux enters the first basic structure a first-order diffracted light flux has a maximum diffraction-light amount among diffracted light fluxes generated when the second light flux enters the first basic structure, and a first-order diffracted light flux has a maximum diffraction-light amount among diffracted light fluxes generated when the third light flux enters the first basic structure. Further, a first-order diffracted light flux has a maximum diffraction-light amount among diffracted light fluxes generated when the first light flux enters the second basic structure (also referred as diffractive structure 2), a minus-first-order diffracted light flux has a maximum diffraction-light amount among diffracted light fluxes generated when the second light flux enters the second basic structure, and a minus-first-order diffracted light flux has a maximum diffraction-light amount among diffracted light fluxes generated when the third light flux enters the second basic structure. On the other hand, the second diffractive structure in the peripheral area has a 5-step step structure. A 0-th-order diffracted light flux has a maximum diffraction-light amount among diffracted light fluxes generated when the first light flux enters the second diffractive structure, and a first-order diffracted light flux has a maximum diffraction-light amount among diffracted light fluxes generated when the second light flux enters the second diffractive structure.

TABLE 5

| Specifications | | | |
|---|---|---|---|
| | BD | DVD | CD |
| Focal length f (mm) | 2.200 | 2.359 | 2.286 |
| Wavelength λ (nm) | 405 | 658 | 785 |
| NA | 0.85 | 0.6 | 0.45 |
| Effective aperture φ (mm) | 3.740 | 2.860 | 2.077 |
| Magnification | 0 | −0.0159 | −0.0154 |
| WD | 0.713 | 0.643 | 0.193 |
| Disc thickness (mm) | 0.0875 | 0.60 | 1.10 |

| Arrangement | | | | | | | | |
|---|---|---|---|---|---|---|---|---|
| | Distance from | | BD | | DVD | | CD | |
| i$^{th}$ surface | optical axis | ri | di (405 nm) | ni (405 nm) | di (658 nm) | ni (658 nm) | di (785 nm) | ni (785 nm) | Remarks |
| 0 | | ∞ | | | 150.00 | | 150.00 | | |
| 1 Stop diameter φ (mm) | | ∞ | 0.0 (3.74) | 1.0000 | 0.0 (2.86) | 1.0000 | 0.0 (2.08) | 1.0000 | Stop |
| 2-1 | 0.000 ≦ h < 1.03 | 2.5445 | 2.6800 | 1.5592 | 2.6800 | 1.5397 | 2.6800 | 1.5363 | Aspheric surface |
| 2-2 | 1.03 ≦ h < 1.44 | 1.5136 | 0.0026 | 1.5592 | 0.0026 | 1.5397 | 0.0026 | 1.5363 | Aspheric surface |
| 2-3 | 1.44 ≦ h | 1.5136 | 0.0026 | 1.5592 | 0.0026 | 1.5397 | 0.0026 | 1.5363 | Aspheric surface |
| 3-1 | 0 ≦ h < 0.423 | −2.5677 | 0.7134 | 1.0000 | 0.6427 | 1.0000 | 0.1935 | 1.0000 | Aspheric surface |
| 3-2 | 0.423 ≦ h | −2.9061 | 0.0000 | 1.0000 | 0.0000 | 1.0000 | 0.0000 | 1.0000 | Aspheric surface |
| 4 | | ∞ | 0.0875 | 1.6195 | 0.6000 | 1.5773 | 1.1000 | 1.5706 | Disc |
| 5 | | ∞ | | | | | | | |

TABLE 5-continued

Aspheric surface coefficient

| | $(2-1)^{th}$ surface | $(2-2)^{th}$ surface | $(2-3)^{th}$ surface | $(3-1)^{th}$ surface | $(3-2)^{th}$ surface |
|---|---|---|---|---|---|
| κ | 5.1011E−01 | −4.2097E−01 | −4.2097E−01 | −3.0000E+01 | −1.0680E+01 |
| A4 | 2.4030E−03 | 1.3811E−02 | 1.3811E−02 | 3.5043E−01 | 2.4524E−01 |
| A6 | 6.8752E−03 | −5.8373E−03 | −5.8373E−03 | −1.8911E+00 | −2.7678E−01 |
| A8 | 1.2734E−03 | −7.2429E−04 | −7.2429E−04 | 1.2149E+01 | 1.8068E−01 |
| A10 | −3.8464E−03 | 1.3280E−03 | 1.3280E−03 | −3.2897E+01 | −6.7951E−02 |
| A12 | −3.5201E−03 | −3.2346E−04 | −3.2346E−04 | 2.2456E−02 | 1.3987E−02 |
| A14 | 8.0380E−05 | 1.1350E−05 | 1.1350E−05 | −5.0789E−03 | −1.1540E−03 |

\* A symbol di − j (j ≠ 1) represents displacement from (di − 1)$^{th}$ surface to (di − j)$^{th}$ surface.
\* A symbol di − 1 represents displacement from (di − 1)$^{th}$ surface to d (i + 1)$^{th}$ surface.

TABLE 6

| | | $(2-1)^{th}$ surface | $(2-2)^{th}$ surface |
|---|---|---|---|
| Optical path difference function coefficient | | | |
| Diffractive structure 1 | λB (nm) | 405 | 405 |
| | Order (BD/DVD/CD) | 2/1/1 | 0/1/− |
| | C1 | −3.9241E−02 | 8.5077E−03 |
| | C2 | 4.6511E−04 | −3.6344E−04 |
| | C3 | 1.2842E−03 | 5.5426E−04 |
| | C4 | 1.8207E−03 | −3.9972E−04 |
| | C5 | −2.9571E−03 | 9.2696E−05 |
| Diffractive structure 2 | λB (nm) | 405 | |
| | Order (BD/DVD/CD) | 1/−1/−1 | |
| | C1 | −8.2898E−04 | |
| | C2 | −5.3106E−04 | |
| | C3 | 3.3360E−03 | |
| | C4 | −3.4106E−03 | |
| | C5 | 1.2086E−03 | |
| Form and efficiency of diffractive structure | | | |
| Diffractive structure 1 | Diffraction type | Blaze type | Step type |
| | Number of steps (in cycle) | — | 5 |
| | BD Diffraction efficiency | 1.00 | 1.00 |
| | DVD Diffraction efficiency | 0.89 | 0.87 |
| | CD Diffraction efficiency | 1.00 | — |
| Diffractive structure 2 | Diffraction type | Step type | |
| | Number of steps (in cycle) | 3 | |
| | BD Diffraction efficiency | 0.67 | |
| | DV Diffraction efficiency | 0.65 | |
| | C Diffraction efficiency | 0.68 | |

Example 4

Lens data of Example 4 are shown in Table 7 and Table 8. In Example 4, the first diffractive structure in the center area has a 7-step step structure. A first-order diffracted light flux has a maximum diffraction-light amount among diffracted light fluxes generated when the first light flux enters the first diffractive structure, a minus-second-order diffracted light flux has a maximum diffraction-light amount among diffracted light fluxes generated when the second light flux enters the first diffractive structure, and a minus-third-order diffracted light flux has a maximum diffraction-light amount among diffracted light fluxes generated when the third light flux enters the first diffractive structure. On the other hand, the second diffractive structure in the peripheral area has a 3-step step structure. A 0-th-order diffracted light flux has a maximum diffraction-light amount among diffracted light fluxes generated when the first light flux enters the second diffractive structure, and a minus-first-order diffracted light flux has a maximum diffraction-light amount among diffracted light fluxes generated when the second light flux enters the second diffractive structure.

TABLE 7

Specifications

| | BD | DVD | CD |
|---|---|---|---|
| Focal length f (mm) | 2.000 | 2.188 | 2.288 |
| Wavelength λ (nm) | 405 | 660 | 785 |
| NA | 0.85 | 0.6 | 0.48 |
| Effective aperture φ (mm) | 3.400 | 2.635 | 2.219 |
| Magnification | 0 | −0.0055 | −0.0159 |
| WD | 0.616 | 0.550 | 0.406 |
| Disc thickness (mm) | 0.0875 | 0.60 | 1.10 |

Arrangement

| | Distance from | | BD | | DVD | | CD | | |
|---|---|---|---|---|---|---|---|---|---|
| $i^{th}$ surface | optical axis | ri | di (405 nm) | ni (405 nm) | di (660 nm) | ni (660 nm) | di (785 nm) | ni (785 nm) | Remarks |
| 0 | | ∞ | | | | | | | |
| 1 Stop diameter φ (mm) | | ∞ | 0.0 (3.40) | 1.0000 | 0.0 (2.64) | 1.0000 | 0.0 (2.22) | 1.0000 | Stop |
| | | | 400.00 | | 145.00 | | | | |
| 2-1 | 0.000 ≦ h < 1.12 | 1.3480 | 2.4400 | 1.5592 | 2.4400 | 1.5397 | 2.4400 | 1.5363 | Aspheric surface |
| 2-2 | 1.12 ≦ h < 1.33 | 1.3289 | −0.0005 | 1.5592 | −0.0005 | 1.5397 | −0.0005 | 1.5363 | Aspheric surface |
| 2-3 | 1.33 ≦ h | 1.3778 | 0.0182 | 1.5592 | 0.0182 | 1.5397 | 0.0182 | 1.5363 | Aspheric surface |
| 3 | | −2.5014 | 0.6156 | 1.0000 | 0.5496 | 1.0000 | 0.4060 | 1.0000 | Aspheric surface |
| 4 | | ∞ | 0.0875 | 1.6195 | 0.6000 | 1.5772 | 1.1000 | 1.5706 | Disc |
| 5 | | ∞ | | | | | | | |

TABLE 7-continued

| | Aspheric surface coefficient | | | |
|---|---|---|---|---|
| | $(2-1)^{th}$ surface | $(2-2)^{th}$ surface | $(2-3)^{th}$ surface | $3^{rd}$ surface |
| κ | −7.1802E−01 | −6.1542E−01 | −6.2188E−01 | −4.0497E+01 |
| A4 | 1.1187E−02 | 1.3693E−02 | 1.0947E−02 | 1.2194E−01 |
| A6 | 1.6809E−02 | −2.6808E−03 | 9.8893E−04 | −1.5241E−01 |
| A8 | −3.5689E−02 | 4.9376E−03 | 6.3238E−03 | 1.5505E−01 |
| A10 | 4.4391E−02 | −3.1934E−03 | −3.5897E−03 | −1.0661E−01 |
| A12 | −2.4125E−02 | 7.1194E−04 | 5.6571E−04 | 3.9902E−02 |
| A14 | 3.0920E−03 | 8.4184E−04 | 7.7601E−04 | −6.2422E−03 |
| A16 | −7.0413E−04 | −8.2070E−04 | −6.8865E−04 | 5.9513E−05 |
| A18 | 2.7793E−03 | 2.7333E−04 | 2.3527E−04 | 0.0000E+00 |
| A20 | −1.0901E−03 | −2.7241E−05 | −2.8882E−05 | 0.0000E+00 |

\* A symbol di − j (j ≠ 1) represents displacement from $(di-1)^{th}$ surface to $(di-j)^{th}$ surface.
\* A symbol di − 1 represents displacement from $(di-1)^{th}$ surface to d $(i+1)^{th}$ surface.

TABLE 8

| | | $(2-1)^{th}$ surface | $(2-2)^{th}$ surface |
|---|---|---|---|
| | Optical path difference function coefficient | | |
| Diffractive structure 1 | λB (nm) | 405 | 405 |
| | Order (BD/DVD/CD) | 1/−2/−3 | 0/−1/— |
| | C1 | −5.1760E−03 | −1.0110E−02 |
| | C2 | 2.0455E−04 | −3.4674E−03 |
| | C3 | −8.0071E−05 | −2.0018E−04 |
| | C4 | −3.5619E−06 | 1.3701E−03 |
| | C5 | 8.2827E−06 | −3.8895E−04 |
| | Form and efficiency of diffractive structure | | |
| Diffractive structure 1 | Diffraction type | Step type | Step type |
| | Number of steps (in cycle) | 7 | 3 |
| | BD Diffraction efficiency | 0.89 | 0.98 |
| | DVD Diffraction efficiency | 0.68 | 0.62 |
| | CD Diffraction efficiency | 0.52 | — |

Example 5

Lens data of Example 5 are shown in Table 9 and Table 10. In Example 5, the first diffractive structure in the center area is formed by overlapping the first basic structure as a blaze structure and a second basic structure as a 4-step step type. A second-order diffracted light flux has a maximum diffraction-light amount among diffracted light fluxes generated when the first light flux enters the first basic structure, a first-order diffracted light flux has a maximum diffraction-light amount among diffracted light fluxes generated when the second light flux enters the first basic structure, and a first-order diffracted light flux has a maximum diffraction-light amount among diffracted light fluxes generated when the third light flux enters the first basic structure. Further, a second-order diffracted light flux has a maximum diffraction-light amount among diffracted light fluxes generated when the first light flux enters the second basic structure, a third-order diffracted light flux has a maximum diffraction-light amount among diffracted light fluxes generated when the second light flux enters the second basic structure, and a third-order diffracted light flux has a maximum diffraction-light amount among diffracted light fluxes generated when the third light flux enters the second basic structure. On the other hand, the second diffractive structure in the peripheral area has a 5-step step structure. A 0-th-order diffracted light flux has a maximum diffraction-light amount among diffracted light fluxes generated when the first light flux enters the second diffractive structure, and a first-order diffracted light flux has a maximum diffraction-light amount among diffracted light fluxes generated when the second light flux enters the second diffractive structure.

TABLE 9

| | Specifications | | |
|---|---|---|---|
| | BD | DVD | CD |
| Focal length f (mm) | 2.200 | 2.278 | 2.263 |
| Wavelength λ (nm) | 405 | 658 | 785 |
| NA | 0.85 | 0.6 | 0.45 |
| Effective aperture φ (mm) | 3.740 | 2.733 | 2.037 |
| Magnification | 0 | 0 | 0 |
| WD | 0.695 | 0.445 | 0.095 |
| Disc thickness (mm) | 0.0875 | 0.60 | 1.10 |

| | Arrangement | | | | | | | |
|---|---|---|---|---|---|---|---|---|
| | Distance from | | BD | | DVD | | CD | |
| $i^{th}$ surface | optical axis | ri | di (405 nm) | ni (405 nm) | di (658 nm) | ni (658 nm) | di (785 nm) | ni (785 nm) | Remarks |
| 0 | | ∞ | ∞ | | ∞ | | ∞ | | |
| 1 Stop diameter φ (mm) | | ∞ | 0.0 (3.74) | 1.0000 | 0.0 (2.73) | 1.0000 | 0.0 (2.04) | 1.0000 | Stop |
| 2-1 | 0.000 ≦ h < 1.02 | 1.6443 | 2.6800 | 1.5592 | 2.6800 | 1.5397 | 2.6800 | 1.5363 | Aspheric surface |
| 2-2 | 1.02 ≦ h < 1.37 | 1.4923 | 0.0029 | 1.5592 | 0.0029 | 1.5397 | 0.0029 | 1.5363 | Aspheric surface |
| 2-3 | 1.37 ≦ h | 1.4923 | 0.0029 | 1.5592 | 0.0029 | 1.5397 | 0.0029 | 1.5363 | Aspheric surface |
| 3-1 | 0 ≦ h < 0.402 | −2.6911 | 0.6947 | 1.0000 | 0.4446 | 1.0000 | 0.0953 | 1.0000 | Aspheric surface |
| 3-2 | 0.402 ≦ h | −2.7896 | 0.0000 | 1.0000 | 0.0000 | 1.0000 | 0.0000 | 1.0000 | Aspheric surface |

TABLE 9-continued

| 4 | ∞ | 0.0875 | 1.6195 | 0.6000 | 1.5773 | 1.1000 | 1.5706 | Disc |
| 5 | ∞ | | | | | | | |

Aspheric surface coefficient

| | $(2-1)^{th}$ surface | $(2-2)^{th}$ surface | $(2-3)^{th}$ surface | $(3-1)^{th}$ surface | $(3-2)^{th}$ surface |
|---|---|---|---|---|---|
| κ | −5.1400E−01 | −4.1983E−01 | −4.1983E−01 | −3.0000E+01 | −1.1083E+01 |
| A4 | 1.1369E−03 | 8.6159E−03 | 8.6159E−03 | 3.6873E−01 | 2.3114E−01 |
| A6 | −4.2206E−03 | −3.7936E−03 | −3.7936E−03 | −2.7664E+00 | −2.6049E−01 |
| A8 | −7.2127E−03 | −9.6074E−04 | −9.6074E−04 | 9.7216E+00 | 1.7789E−01 |
| A10 | 4.9068E−03 | 1.1995E−03 | 1.1995E−03 | −8.0694E+00 | −6.9202E−02 |
| A12 | 8.1277E−04 | −3.3630E−04 | −3.3630E−04 | 2.2456E−02 | 1.4986E−02 |
| A14 | 1.8342E−04 | 2.1129E−05 | 2.1129E−05 | −5.0789E−03 | −1.3704E−03 |

* A symbol di − j (j ≠ 1) represents displacement from $(di-1)^{th}$ surface to $(di-j)^{th}$ surface.
* A symbol di − 1 represents displacement from $(di-1)^{th}$ surface to d $(i+1)^{th}$ surface.

TABLE 10

| | | $(2-1)^{th}$ surface | $(2-2)^{th}$ surface |
|---|---|---|---|
| Optical path difference function coefficient | | | |
| Diffractive structure 1 | λB (nm) | 405 | 405 |
| | Order (BD/DVD/CD) | 2/1/1 | 0/1/− |
| | C1 | −1.0525E−02 | 1.3516E−03 |
| | C2 | −9.9297E−04 | −9.5309E−04 |
| | C3 | −1.0110E−03 | 2.4857E−04 |
| | C4 | −1.2013E−03 | −1.5478E−04 |
| | C5 | 1.2718E−03 | 1.7802E−05 |
| Diffractive structure 2 | λB (nm) | 405 | |
| | Order (BD/DVD/CD) | 2/3/3 | |
| | C1 | −4.1073E−04 | |
| | C2 | −6.0992E−04 | |
| | C3 | 1.6799E−04 | |
| | C4 | −2.5022E−04 | |
| | C5 | 7.9097E−05 | |
| Form and efficiency of diffractive structure | | | |
| Diffractive structure 1 | Diffraction type | Blaze type | Step type |
| | Number of steps (in cycle) | — | 5 |
| | BD Diffraction efficiency | 1.00 | 1.00 |
| | DVD Diffraction efficiency | 0.89 | 0.87 |
| | CD Diffraction efficiency | 1.00 | — |
| Diffractive structure 2 | Diffraction type | Step type | |
| | Number of steps (in cycle) | 4 | |
| | BD Diffraction efficiency | 0.81 | |
| | DV Diffraction efficiency | 0.65 | |
| | C Diffraction efficiency | 0.61 | |

Table 11 shows collectively values including m1, WD1−WD2, WD1−WD3, m2, m3, 1.57 m2+0.123, 1.57 m2+0.24, 1.79 m3+0.333 and 1.66 m3+0.508, for respective examples.

TABLE 11

| Conditional expressions | | Example 1 | Example 2 | Example 3 | Example 4 | Example 5 |
|---|---|---|---|---|---|---|
| (1) | m1 | 0.00 | 0.00 | 0.00 | 0.00 | 0.00 |
| (2) | WD1 − WD2 | 0.07 | 0.08 | 0.07 | 0.07 | 0.25 |
| (3) | WD1 − WD3 | 0.27 | 0.23 | 0.52 | 0.21 | 0.60 |
| (4) | m2 | −0.02 | −0.02 | −0.02 | −0.01 | 0.00 |
| (5) | m3 | −0.02 | −0.02 | −0.02 | −0.02 | 0.00 |
| | 1.57m2 + 0.123 | 0.10 | 0.09 | 0.10 | 0.11 | 0.12 |
| | 1.57m2 + 0.24 | 0.21 | 0.21 | 0.22 | 0.23 | 0.24 |
| | 1.79m3 + 0.333 | 0.30 | 0.30 | 0.31 | 0.30 | 0.33 |
| | 1.66m3 + 0.508 | 0.48 | 0.47 | 0.48 | 0.48 | 0.51 |

As shown in Table 11, values of WD1−WD2 for Examples 1-4 satisfy respectively 0≦(WD1−WD2)≦1.57 m2+0.123 of conditional expression (2). Values of WD1−WD3 for Examples 1, 2 and 4 satisfy respectively 0≦(WD1−WD3)≦ 1.79 m3+0.333 of conditional expression (3).

A value of WD1−WD3 of Example 3 satisfies 1.66 m3+0.508≦(WD1−WD3)≦0.7 of conditional expression (3).

Further, values of WD1−WD2 and WD1−WD3 of Example 5 satisfy 1.57 m2+0.24≦(WD1−WD2)≦0.7 of conditional expression (2) and 1.66 m3+0.508≦(WD1−WD3)≦ 0.7 of conditional expression (3).

REFERENCE SIGNS LIST

AC Two-axis actuator
PPS Dichroic prism
CL Collimation lens
LD1 Blue-violet semiconductor laser
LM Laser module
OBJ Objective lens
PL1 Protective substrate
PL2 Protective substrate
PL3 Protective substrate
PU1 Optical pickup apparatus
RL1 Information recording surface
RL2 Information recording surface
RL3 Information recording surface
CN Central area
MD Peripheral area
OT Most peripheral area

The invention claimed is:

1. An objective lens for use in an optical pickup apparatus comprising an objective lens, for forming a converged spot on an information recording surface of a first optical disc including a protective layer with a thickness t1 by using a first light flux with a wavelength λ1 (λm) emitted from a first light source, for forming a converged spot on an information recording surface of a second optical disc including a protective layer with a thickness t2 (t1≦t2) by using a second light flux with a wavelength λ2 (λ1<λ2) emitted from a second light source, and for forming a converged spot on an information recording surface of a third optical disc including a protective layer with a thickness t3 (t2<t3) by using a third light flux with a wavelength λ3 (λ2<λ3) emitted from a third light source, wherein the objective lens is formed of a single lens, an optical surface of the single lens comprises a central area whose center is located at an optical axis, a peripheral area in a ringed shape formed around the central area, and a most peripheral area in a ringed shape formed around the peripheral area, the first light flux which has passed through the central area, the peripheral area and the most peripheral area is converged on the information recording surface of the first optical disc, the second light flux which has passed through the central area and the peripheral area is converged on the information recording surface of the second optical disc, and the second light flux which has passed through the most peripheral area is not converged on the information recording surface of the second optical disc, the third light flux which has passed through the central area is converged on the information recording surface of the third optical disc, and the third light flux which has passed through the peripheral area and the most peripheral area is not converged on the information recording surface of the third optical disc, the most peripheral area is a refractive surface, and the objective lens satisfies all of the conditional expressions (1) to (3), where m1 is an image-forming magnification of the objective lens when information is reproduced and/or recoded for the first optical disc, m2 is an image-forming magnification of the objective lens when information is reproduced and/or recoded for the second optical disc, m3 is an image-forming magnification of the objective lens when information is reproduced and/or recoded for the third optical disc, WD1 (mm) is a working distance of the objective lens when information is reproduced and/or recoded for the first optical disc, WD2 (mm) is a working distance of the objective lens when information is reproduced and/or recoded for the second optical disc, and WD3 (mm) is a working distance of the objective lens when information is reproduced and/or recoded for the third optical disc:

$$-0.02 \leq m1 \leq 0.02 \tag{1}$$

$$0 \leq (WD1-WD2) \leq 1.57m2+0.123 \text{ or}$$

$$1.57m2+0.24 \leq (WD1-WD2) \leq 0.7 \tag{2}$$

$$0 \leq (WD1-WD3) \leq 1.79m3+0.333 \text{ or}$$

$$1.66m3+0.508 \leq (WD1-WD3) \leq 0.7 \tag{3}$$

2. The objective lens of claim 1, by satisfying the following conditional expressions (4) and (5):

$$-0.02 \leq m2 \leq 0.02 \tag{4}$$

$$-0.02 \leq m3 \leq 0.02 \tag{5}$$

3. The objective lens of claim 1, satisfying the following conditional expression:

$$m1=0 \tag{1'}$$

$$m2=0 \tag{4'}$$

$$m3=0 \tag{5'}$$

4. The objective lens of claim 1,
wherein the peripheral area comprises a second diffractive structure,
a 0-th-order diffracted light flux has a maximum diffraction-light amount among diffracted light fluxes generated when the first light flux enters the second diffractive structure, and
a first-order diffracted light flux has a maximum diffraction-light amount among diffracted light fluxes generated when the second light flux enters the second diffractive structure.

5. The objective lens of claim 1,
wherein the central area comprises a first diffractive structure,
the first diffractive structure has a blaze structure,
a second-order diffracted light flux has a maximum diffraction-light amount among diffracted light fluxes generated when the first light flux enters the first diffractive structure,
a first-order diffracted light flux has a maximum diffraction-light amount among diffracted light fluxes generated when the second light flux enters the first diffractive structure, and
a first-order diffracted light flux has a maximum diffraction-light amount among diffracted light fluxes generated when the third light flux enters the first diffractive structure.

6. The objective lens of claim 1,
wherein the central area comprises a first diffractive structure,
the first diffractive structure is a structure in which a first blaze structure and a second blaze structure are overlapped together,
a second-order diffracted light flux has a maximum diffraction-light amount among diffracted light fluxes generated when the first light flux enters the first blaze structure,
a first-order diffracted light flux has a maximum diffraction-light amount among diffracted light fluxes generated when the second light flux enters the first blaze structure,
a first-order diffracted light flux has a maximum diffraction-light amount among diffracted light fluxes generated when the third light flux enters the first blaze structure,
a first-order diffracted light flux has a maximum diffraction-light amount among diffracted light fluxes generated when the first light flux enters the second blaze structure,
a first-order diffracted light flux has a maximum diffraction-light amount among diffracted light fluxes generated when the second light flux enters the second blaze structure, and
a first-order diffracted light flux has a maximum diffraction-light amount among diffracted light fluxes generated when the third light flux enters the second blaze structure.

7. The objective lens of claim 1,
wherein the central area comprises a first diffractive structure, and
the first diffractive structure includes a step structure.

8. The objective lens of claim 1,
wherein the central area comprises a first diffractive structure, and the first diffractive structure is formed by overlapping a blaze structure and a step structure together.

9. The objective lens of claim 5, satisfying any one of the following conditional expressions (6) and (7),
where dor1 is a diffraction order number of a diffracted light with a maximum light amount among diffracted light fluxes generated when the first light flux enters the first diffractive structure,
dor2 is a diffraction order number of a diffracted light with a maximum light amount among diffracted light fluxes generated when the second light flux enters the first diffractive structure,
dor3 is a diffraction order number of a diffracted light with a maximum light amount among diffracted light fluxes generated when the third light flux enters the first diffractive structure,
$C\lambda 1$ is a second-order term with respect to the first light flux in an optical path difference function for defining the first diffractive structure,
$C\lambda 2$ is a second-order term with respect to the second light flux in an optical path difference function for defining the first diffractive structure, and
$C\lambda 3$ is a second-order term with respect to the third light flux in an optical path difference function for defining the first diffractive structure:

$$(dor1 \times C\lambda 1)/(dor2 \times C\lambda 2) < 0 \qquad (6)$$

$$(dor1 \times C\lambda 1)/(dor3 \times C\lambda 3) < 0 \qquad (7).$$

10. An optical pickup apparatus comprising the objective lens of claim 1.

11. The objective lens of claim 6, satisfying any one of the following conditional expressions (6) and (7),
where dor1 is a diffraction order number of a diffracted light with a maximum light amount among diffracted light fluxes generated when the first light flux enters the first diffractive structure,
dor2 is a diffraction order number of a diffracted light with a maximum light amount among diffracted light fluxes generated when the second light flux enters the first diffractive structure,
dor3 is a diffraction order number of a diffracted light with a maximum light amount among diffracted light fluxes generated when the third light flux enters the first diffractive structure,
$C\lambda 1$ is a second-order term with respect to the first light flux in an optical path difference function for defining the first diffractive structure,
$C\lambda 2$ is a second-order term with respect to the second light flux in an optical path difference function for defining the first diffractive structure, and
$C\lambda 3$ is a second-order term with respect to the third light flux in an optical path difference function for defining the first diffractive structure:

$$(dor1 \times C\lambda 1)/(dor2 \times C\lambda 2) < 0 \qquad (6)$$

$$(dor1 \times C\lambda 1)/(dor3 \times C\lambda 3) < 0 \qquad (7).$$

12. The objective lens of claim 7, satisfying any one of the following conditional expressions (6) and (7),
where dor1 is a diffraction order number of a diffracted light with a maximum light amount among diffracted light fluxes generated when the first light flux enters the first diffractive structure,
dor2 is a diffraction order number of a diffracted light with a maximum light amount among diffracted light fluxes generated when the second light flux enters the first diffractive structure,
dor3 is a diffraction order number of a diffracted light with a maximum light amount among diffracted light fluxes generated when the third light flux enters the first diffractive structure,
$C\lambda 1$ is a second-order term with respect to the first light flux in an optical path difference function for defining the first diffractive structure,
$C\lambda 2$ is a second-order term with respect to the second light flux in an optical path difference function for defining the first diffractive structure, and
$C\lambda 3$ is a second-order term with respect to the third light flux in an optical path difference function for defining the first diffractive structure:

$$(dor1 \times C\lambda 1)/(dor2 \times C\lambda 2) < 0 \qquad (6)$$

$$(dor1 \times C\lambda 1)/(dor3 \times C\lambda 3) < 0 \qquad (7).$$

13. The objective lens of claim 8, satisfying any one of the following conditional expressions (6) and (7),
where dor1 is a diffraction order number of a diffracted light with a maximum light amount among diffracted light fluxes generated when the first light flux enters the first diffractive structure,
dor2 is a diffraction order number of a diffracted light with a maximum light amount among diffracted light fluxes generated when the second light flux enters the first diffractive structure,
dor3 is a diffraction order number of a diffracted light with a maximum light amount among diffracted light fluxes generated when the third light flux enters the first diffractive structure,
$C\lambda 1$ is a second-order term with respect to the first light flux in an optical path difference function for defining the first diffractive structure,
$C\lambda 2$ is a second-order term with respect to the second light flux in an optical path difference function for defining the first diffractive structure, and
$C\lambda 3$ is a second-order term with respect to the third light flux in an optical path difference function for defining the first diffractive structure:

$$(dor1 \times C\lambda 1)/(dor2 \times C\lambda 2) < 0 \qquad (6)$$

$$(dor1 \times C\lambda 1)/(dor3 \times C\lambda 3) < 0 \qquad (7).$$

* * * * *